(12) United States Patent
Zuberi et al.

(10) Patent No.: US 7,578,865 B2
(45) Date of Patent: Aug. 25, 2009

(54) METHOD OF FORMING A POROUS SUBSTRATE HAVING INORGANIC BONDS

(75) Inventors: Bilal Zuberi, Cambridge, MA (US); Robert G. Lachenauer, Weston, MA (US); Sunilkumar C. Pillai, North Billerica, MA (US); William M Carty, Alfred Station, NY (US)

(73) Assignee: GEO2 Technologies, Inc., Woburn, MA (US)

( * ) Notice: Subject to any disclaimer, the term of this patent is extended or adjusted under 35 U.S.C. 154(b) by 99 days.

(21) Appl. No.: 11/465,758

(22) Filed: Aug. 18, 2006

(65) Prior Publication Data

US 2007/0108647 A1    May 17, 2007

Related U.S. Application Data

(60) Provisional application No. 60/737,237, filed on Nov. 16, 2005.

(51) Int. Cl.
*B01D 39/00* (2006.01)
*B01D 39/06* (2006.01)
*B01D 39/14* (2006.01)

(52) U.S. Cl. .............................. 55/523; 55/522; 55/524

(58) Field of Classification Search .................. 264/57, 264/59; 55/522–524
See application file for complete search history.

(56) References Cited

U.S. PATENT DOCUMENTS

| | | | |
|---|---|---|---|
| 3,819,334 A * | 6/1974 | Yoshida et al. .............. 422/173 |
| 3,899,555 A | 8/1975 | Takeo et al. |
| 3,912,658 A | 10/1975 | Kaneko et al. |
| 4,047,965 A | 9/1977 | Karst et al. |
| 4,053,011 A | 10/1977 | Riewald et al. |
| 4,071,594 A | 1/1978 | Pearson et al. |
| 4,329,162 A | 5/1982 | Pitcher, Jr. |
| 4,409,284 A | 10/1983 | Sugino et al. |
| 4,416,676 A | 11/1983 | Montierth |
| 4,417,908 A | 11/1983 | Pitcher, Jr. |
| 4,420,316 A | 12/1983 | Frost et al. |
| 4,448,833 A | 5/1984 | Yamaguchi et al. |

(Continued)

FOREIGN PATENT DOCUMENTS

CN    1349839    5/2002

(Continued)

OTHER PUBLICATIONS

"Fiber-reinforced SiC", *Jpn. Technol. Highlights*, vol. 6, No. 4, ISSN: 1060-8117,(Feb. 22, 1995), 15.

(Continued)

*Primary Examiner*—Walter D Griffin
*Assistant Examiner*—Amber Orlando

(57) ABSTRACT

A method is provided for producing a highly porous substrate. More particularly, the present invention enables fibers, such as organic, inorganic, glass, ceramic, polymer, or metal fibers, to be combined with binders and additives, and extruded, to form a porous substrate. Depending on the selection of the constituents used to form an extrudable mixture, the present invention enables substrate porosities of about 60% to about 90%, and enables process advantages at other porosities, as well. The extrudable mixture may use a wide variety of fibers and additives, and is adaptable to a wide variety of operating environments and applications. Additives can be selected that form inorganic bonds between overlapping fibers in the extruded substrate that provide enhanced strength and performance of the porous substrate in a variety of applications, such as, for example, filtration and as a host for catalytic processes, such as catalytic converters.

41 Claims, 16 Drawing Sheets

U.S. PATENT DOCUMENTS

| | | | |
|---|---|---|---|
| 4,652,286 A * | 3/1987 | Kusuda et al. ............... 55/523 |
| 4,761,323 A | 8/1988 | Muhlratzer et al. |
| 4,810,458 A | 3/1989 | Oshima |
| 4,824,711 A | 4/1989 | Cagliostro et al. |
| 4,833,115 A | 5/1989 | Koschlig et al. |
| 4,968,467 A | 11/1990 | Zievers |
| 5,053,092 A | 10/1991 | Lachman |
| 5,070,588 A | 12/1991 | Miwa et al. |
| 5,075,160 A | 12/1991 | Stinton et al. |
| 5,078,818 A | 1/1992 | Han et al. |
| 5,098,455 A * | 3/1992 | Doty et al. ............... 55/523 |
| 5,123,243 A | 6/1992 | Baddour |
| 5,126,431 A | 6/1992 | Nesheiwat |
| 5,194,407 A | 3/1993 | Waisala et al. |
| 5,194,414 A | 3/1993 | Kuma |
| 5,196,120 A | 3/1993 | White |
| 5,251,564 A | 10/1993 | Rim et al. |
| 5,298,046 A | 3/1994 | Piesert |
| 5,316,710 A | 5/1994 | Tasaki et al. |
| 5,322,537 A | 6/1994 | Nakamura et al. |
| 5,338,253 A | 8/1994 | Damsohn et al. |
| 5,348,987 A | 9/1994 | Kato et al. |
| 5,376,341 A | 12/1994 | Gulati |
| 5,488,017 A | 1/1996 | Szweda et al. |
| 5,518,678 A | 5/1996 | Miyamoto et al. |
| 5,518,833 A | 5/1996 | Repplinger et al. |
| 5,545,297 A | 8/1996 | Andersen et al. |
| 5,549,859 A | 8/1996 | Andersen et al. |
| 5,611,831 A * | 3/1997 | Matsuoka et al. ............... 55/486 |
| 5,622,041 A | 4/1997 | Feeley et al. |
| 5,623,013 A | 4/1997 | Tanaka et al. |
| 5,629,067 A | 5/1997 | Kotani et al. |
| 5,662,731 A | 9/1997 | Andersen et al. |
| 5,681,373 A | 10/1997 | Taylor et al. |
| 5,707,584 A | 1/1998 | Terpstra et al. |
| 5,714,226 A | 2/1998 | Disselbeck |
| 5,820,833 A | 10/1998 | Kawamura |
| 5,851,326 A | 12/1998 | Custer et al. |
| 5,900,207 A | 5/1999 | Danforth et al. |
| 5,914,187 A | 6/1999 | Naruse et al. |
| 5,948,257 A | 9/1999 | Custer et al. |
| 6,040,266 A | 3/2000 | Fay et al. |
| 6,117,518 A | 9/2000 | Cawse et al. |
| 6,155,432 A | 12/2000 | Wilson et al. |
| 6,194,066 B1 | 2/2001 | Hoffman |
| 6,228,293 B1 | 5/2001 | Kriegsmann et al. |
| 6,238,618 B1 | 5/2001 | Brundage et al. |
| 6,261,510 B1 | 7/2001 | Terpstra et al. |
| 6,321,915 B1 | 11/2001 | Wilson et al. |
| 6,365,092 B1 | 4/2002 | Backa |
| 6,379,446 B1 | 4/2002 | Andersen et al. |
| 6,423,537 B1 | 7/2002 | Soria et al. |
| 6,444,006 B1 * | 9/2002 | Haberkamp et al. ............ 55/521 |
| 6,506,336 B1 | 1/2003 | Beall et al. |
| 6,547,967 B1 | 4/2003 | Adler et al. |
| 6,582,490 B2 | 6/2003 | Miller et al. |
| 6,613,384 B1 * | 9/2003 | Waller .................. 427/243 |
| 6,651,773 B1 | 11/2003 | Marocco |
| 6,669,751 B1 * | 12/2003 | Ohno et al. ............... 55/523 |
| 6,716,376 B1 | 4/2004 | Haug et al. |
| 6,860,917 B2 | 3/2005 | Henrichsen et al. |
| 6,881,361 B1 | 4/2005 | Schulze et al. |
| 6,899,777 B2 | 5/2005 | Vaidyanathan et al. |
| 6,935,461 B2 | 8/2005 | Marocco |
| 6,946,013 B2 | 9/2005 | Alward et al. |
| 6,991,672 B2 | 1/2006 | Marrecau |
| 6,991,673 B2 | 1/2006 | Wastijn et al. |
| 7,052,532 B1 * | 5/2006 | Liu et al. ............... 96/154 |
| 7,083,842 B2 | 8/2006 | Masukawa et al. |
| 7,090,715 B2 | 8/2006 | Chung et al. |
| 7,112,050 B2 | 9/2006 | Bernas et al. |
| 7,138,002 B2 | 11/2006 | Hamanaka et al. |
| 7,138,003 B2 | 11/2006 | Ichikawa et al. |
| 7,179,516 B2 * | 2/2007 | Ichikawa ............... 428/116 |
| 2001/0037972 A1 | 11/2001 | Quick et al. |
| 2002/0014723 A1 | 2/2002 | Wallin et al. |
| 2003/0127393 A1 | 7/2003 | Tepper et al. |
| 2003/0178357 A1 | 9/2003 | Wolff et al. |
| 2004/0139734 A1 | 7/2004 | Schmeichel et al. |
| 2004/0194505 A1 | 10/2004 | Wang et al. |
| 2004/0231307 A1 * | 11/2004 | Wood et al. ............... 55/523 |
| 2005/0040003 A1 | 2/2005 | Kienzle et al. |
| 2005/0042151 A1 | 2/2005 | Alward et al. |
| 2005/0049362 A1 | 3/2005 | Buckley et al. |
| 2005/0069469 A1 * | 3/2005 | Fu et al. ............... 422/177 |
| 2005/0074374 A1 | 4/2005 | Ogura |
| 2005/0102987 A1 * | 5/2005 | Kudo ............... 55/523 |
| 2005/0109023 A1 * | 5/2005 | Kudo et al. ............... 60/311 |
| 2005/0126140 A1 * | 6/2005 | Ito et al. ............... 55/523 |
| 2005/0181193 A1 | 8/2005 | Lenke et al. |
| 2005/0217228 A1 | 10/2005 | Beall et al. |
| 2005/0230029 A1 | 10/2005 | Vaidyanathan et al. |
| 2005/0271920 A1 | 12/2005 | Eshraghi et al. |
| 2006/0154057 A1 | 7/2006 | Nonninger |
| 2007/0032370 A1 | 2/2007 | Weisensel et al. |
| 2007/0261557 A1 | 11/2007 | Gadkaree et al. |

FOREIGN PATENT DOCUMENTS

| | | |
|---|---|---|
| EP | 2176179 | 12/1986 |
| EP | 0552715 | 7/1993 |
| EP | 0635298 | 1/1995 |
| EP | 0728521 | 8/1996 |
| EP | 00776696 | 6/1997 |
| EP | 01338326 | 8/2003 |
| EP | 01440722 | 7/2004 |
| EP | 01541216 | 6/2005 |
| JP | 61230747 | 10/1986 |
| JP | 63242980 | 10/1988 |
| JP | 03258347 | 11/1991 |
| JP | 06031177 | 2/1994 |
| JP | 07000757 | 1/1995 |
| JP | 2001-252529 | 9/2001 |
| KR | 2001016633 | 3/2001 |
| WO | WO-2006070540 | 7/2006 |

OTHER PUBLICATIONS

"Porosity reduces CMC properties", *Adv. Compos. Bull.*, ISSN: 0951-953X,(Feb. 1995),2-3.

"Rapid performing developed for metal matrix composites", *High-Performance Composites*, vol. 9, No. 1, ISSN: 1081-9223, (Jan.-Feb. 2001),60.

Gulati, Suresh T., "Physical Durability of Thin Wall Ceramic Substrates", *SAE Technical Paper Series 982635*, (Oct. 1998).

"Diesel Filter Materials", *DieselNet Technology Guide*, www.DieselNet.com,(Jan. 2003).

"Wall-Flow Monoliths", *DieselNet Technology Guide*, www.DieselNet.com,(Sep. 2005).

"Ceramic Catalyst Substrates", *DieselNet Technology Guide*, www.DieselNet.com,(Apr. 1997).

"Ceramic Fibers and Cartidges", *DieselNet Technology Guide*, www.DieselNet.com,(Jul. 2001).

Cooke, Theodore F., "Inorganic Fibers—A Literature Review", *J. Am. Ceram. Soc.*, 74 (12), (1991),2959-2978.

Miller, Robert K., et al., "Design, Development and Performance of a Composite Diesel Particulate Filter", *SAE Technical Paper Series*, 2002-01-0323,(Mar. 2002).

Li, Cheng G., et al., "Properties and Performance of Diesel Particulate Filters of an Advanced Ceramic Material", *SAE Technical Paper Series*, 2004-01-0955,(Mar. 2004).

Blackburn, Stuart et al., "Mullite-Alumina Composites by Extrusion", *J. Am. Ceram. Soc.* 75[4], (1992),953-957.

* cited by examiner

EXAMPLE SUBSTRATE COMPOSITION - - PERCENTAGES BY WEIGHT

| | -FIBER<br>(ie Mullite) | -OXIDE BOND<br>(ie glass) | TARGET POROSITY<br>(of substrate) |
|---|---|---|---|
| A: | 80% | 20% | 70% |
| Range: | 60% to 95% | 5% to 40% | 55% to 85% |

TABLE 1 -- FIBER SELECTION

| FIBER COMPOSITIONS | FIBER COMPOSITIONS (CONT) |
| --- | --- |
| Mullite | Phenolic fibers |
| Alumina | Polymeric fibers |
| Silica | Cellulose |
| Blends of alumina and silica | Keratin |
| Blends of alumina | Kevlar |
| Silica and aluminosilicate | Nylon |
| Aluminaborosilicate | PTFE |
| Silicon carbide | Teflon |
| Silicon nitride, | Kynol |
| Cordierite | Mylar |
| Nextel 312, 440, 550, 610, 650, 720, | Zircon fibers |
| YAG (yttrium aluminum garnet) fibers and the | Nickel |
| AETB compositions | Copper |
| Alumina-mullite | Brass |
| Alumina-silica-zirconia | Stainless Steel |
| Alumina-silica-chromia | Nickel Chromium |
| Magnesium-silicate | Ni3Al |
| Magnesium strontium silicate | |
| Magnesium calcium strontium silicate | |
| Fiber-glass | WHISKERS |
| E-glass | Al2O3 |
| Cordierite fiber | MgO |
| Aluminum titanate fiber | MgO-Al2O3 |
| Strontium titanium oxide | Fe2O3 |
| Titania fiber | BeO |
| Titanium carbide fiber | MoO |
| Calciumaluminasilicate | NiO |
| Nextel fibers | Cr2O3 |
| Almax fibers | ZnO |
| Fibrox fibers | Si3N4 |
| Polyster fibers | AlN |
| Aramid fibers | ZnS |
| Carbon fibers | CdS |
| Hoskins | Tungsten Oxide |
| Inconel | LaB6 |
| Hastelloy | CrB |
| Yittrium nickel garnett | SiC |
| FeCrAl alloys | B4C |

FIG. 6

TABLE 1 - - FIBER SELECTION (CONT)

FIBER STATES

Amorphous
Glass
Glass-Ceramic
Polycrystalline
Mono-crystalline (whisker)
Whisker-like

SPECIFIC DATA ON SELECTED FIBERS

| Trade Name | Manufacturer | Composition (wt%) |
|---|---|---|
| Fiber FP | DuPont | >99% a-$Al_2O_3$ |
| PRD-166 | DuPont | ~80% a-$Al_2O_3$ ~20% $ZrO_2$ |
| Nextel 312 | 3M | 62% $Al_2O_3$ 24% $SiO_2$ 14% $B_2O_3$ |
| Nextel 720 | 3M | 85% $Al_2O_3$ 15% $SiO_2$ |
| Nextel 550 | 3M | 73% $Al_2O_3$ 27% $SiO_2$ |
| Nextel 610 | 3M | 0.2–0.3% $SiO_2$ 0.4–0.7% $Fe_2O_3$ > 99% a-$Al_2O_3$ |
| Almax | Mitsui Mining | > 99% a-$Al_2O_3$ |
| Altex | Sumitomo | 85% ?-$Al_2O_3$ 15% $SiO_2$ |
| Saphikon | Saphikon | 100% $Al_2O_3$ |
| Nicalon NL200 | | Si-C-O |
| Hi-Nicalon | | Si-C |
| Tyranno Lox M | | Si-C-O-Ti |
| Sylramic | | SiC, $TiB_2$ |
| Tonen | | Si-N-C |
| SCS-6 | | SiC |
| Nextel 610 | | $Al_2O_3$ |
| Nextel 720 | | $Al_2O_3$-$SiO_2$ |
| Almax | | $Al_2O_3$ |
| Saphikon | | $Al_2O_3$ (single crystal) |

Note: Nextel 312 has a composition (by weight) of 62% alumina, 24% silica and 14% boria; Nextel 440 has a composition of 70% alumina, 28% silica and 2% boria; Nextel 550 is 73% alumina and 27% silica; Nextel 610 is >99% alumina; and Nextel 720 is 85% alumina and 15% silica. AETB is an acronym for alumina-enhanced thermal barrier, and AETB materials include alumina-silica-boria compounds, and combinations of alumina, silica, boria, and/or aluminoborosilicates.

**FIG. 6
(CONTINUED)**

Table 2 -- Binder Selection

ORGANIC BINDERS

<u>Thermo Plastic Resins</u>
polyethylene
polypropylene
polybutene
polystyrene
poly vinyl acetate
polyester
Isotactic polypropylen
atactic polypropylene
polysulphone
polyacetal polymers
polymethyl methacrylate
fumaron-indane copolymer
ethylene vinyl acetate copolymer
styrene-butadiene copolymer
acryl rubber
polyvinyl butyral
inomer resin <u>Thermosetting Binders</u>
Epoxy resin
nylon
phenol formaldehide
phenol furfural <u>Waxes</u>
paraffin wax
wax emulsions
microcrystalline wax <u>Others</u>
Celluloses
dextrines
chlorinated hydrocarbons
refined alginates
starches
gelatins
lignins
rubbers
acrylics
bitumens
casein
gums
albumins
proteins
glycols

INORGANIC BINDERS
fused silica
fumed silica
alumina
aluminaosilicate
aluminaborosilicate
soluble silicates
soluble aluminates
soluble phosphates
ball clay
kaolin
bentonite
colloidal silica
colloidal alumina
borophosphates

WATER SOLUABLE BINDERS
Hydroxypropyl methyl cellulose
hydroxyethyl cellulose
methyl cellulose
sodium carboxymethyl cellulose
polyvinyl alcohol
polyvinyl pyrrolidone
polyethylene oxide
polyacrylamides
polyethyterimine
agar
agarose
molasses
dextrines
starch
lignosulfonates
lignin liquor
sodium alginate
gum arabic
xanthan gum
gum tragacanth
gum karaya
locust bean gum
irish moss
scleroglucan
acrylics
cationic galactomanan

PLASTICIZERS
Stearic acid
polyethylene glycol
polypropylene glycol
propylene glycol
ethylene glycol
diethylene glycol
triethylene glycol
tetraethylene glycol
dimethyl phthalate
dibutyl phthalate
diethyl phthalate
dioctyl phthalate
diallyl phthalate
glycerol
oleic acid
butyl stearate
microcrystalline wax
paraffin wax
japan wax
carnauba wax
bees wax
ester wax
vegetable oil
fish oil
silicon oil
hydrogenated peanut oil
tritolyl phosphate
clycerol monostearate
organo silane
water

FIG. 6
(CONTINUED)

TABLE 3 - - PORE FORMER SELECTION

215 carbon black
activated carbon
graphite flakes
synthetic graphite
wood flour
modified starch
starch
celluloses
coconut shell flour
husks
latex spheres
bird seeds
saw dust
pyrolyzable polymers
   poly (alkyl methacrylate)
      polymethyl methacrylate
      polyethyl methacrylate
      poly n-butyl methacrylate
   polyethers
      poly tetrahydrofuran
      poly (1,3-dioxolane)
   poly (alkalene oxides)
      polyethylene oxide
      polypropylene oxide pyrolyzable polymers (cont)
   methacrylate copolymers
   polyisobutylene
   polytrimethylene carbonate
   poly ethylene oxalate
   poly beta-propiolactone
   poly delta-valerolactone
   polyethylene carbonate
   polypropylene carbonate
   vinyl toluene/alpha-methyl styrene copolymer
   styrene/alpha-methyl styrene copolymers
   olefin-sulfur dioxide copolymers <u>synthetic graphite</u>
<u>petroleum coke</u>

TABLE 4 - - FLUID SELECTION

225

Water
Melted Binder (see Table 2)
Organic solvents

FIG. 6
(CONTINUED)

METHOD OF FORMING A POROUS SUBSTRATE HAVING INORGANIC BONDS

RELATED APPLICATIONS

This application claims priority to U.S. provisional patent application No. 60/737,237, filed Nov. 16, 2005, entitled "System for Extruding a Porous Substrate"; to U.S. patent application Ser. No. 11/323,429, filed Dec. 30, 2005, entitled "An Extruded Porous Substrate and Products Using the Same"; to U.S. patent application Ser. No. 11/322,777, filed Dec. 30, 2005, entitled "Process for Extruding a Porous Substrate"; and to U.S. patent application Ser. No. 11/323,430, filed Dec. 30, 2005, entitled "An Extrudable Mixture for Forming a Porous Block"; all of which are incorporated herein in their entirety.

BACKGROUND

1. Field of the Invention

The present invention relates generally to an extrusion processes for extruding a porous substrate, and in one particular implementation to an extrusion process for extruding a porous ceramic substrate.

2. Description of the Related Art

Many processes require rigid substrates for facilitating and supporting various processes. For example, substrates are used in filtering applications to filter particulate matter, separate different substances, or remove bacteria or germs from air. These substrates may be constructed to operate in air, exhaust gases or liquids, and may be manufactured to endure substantial environmental or chemical stresses. In another example, catalytic materials are deposited on the substrate for facilitating chemical reactions. For example, a precious metal may be deposited on an appropriate substrate, and the substrate may then act to catalytically convert dangerous exhaust gases into less noxious gases. Typically, these rigid substrates operate more effectively with a higher porosity.

Porosity is generally defined as the property of a solid material defining the percentage of the total volume of that material which is occupied by open space. For example, a substrate with 50% porosity has half the volume of the substrate occupied by open spaces. In this way, a substrate with a higher porosity has less mass per volume than a substrate with a lower porosity. Some applications benefit from a lower mass substrate. For example, if a substrate is used to support a catalytic process, and the catalytic process operates at an elevated temperature, a substrate with a lower thermal mass will more quickly heat to its operational temperature. In this way, the time for the catalyst to be heated to its operational temperature, i.e., light off time, is reduced by using a more porous and less thermally massive substrate.

Permeability is also an important characteristic for substrates, particularly filtering and catalytic substrates. Permeability is related to porosity, in that permeability is a measure of how easily a fluid, such as a liquid or gas, may flow through the substrate. Most applications benefit from a highly permeable substrate. For example, an internal combustion engine operates more efficiently when the after-treatment filter provides lower back pressure to the engine. Low back pressure is created by using a more highly permeable substrate. Since permeability is more difficult to measure than porosity, porosity is often used as a substitute guide to the permeability of a substrate. However, this is not a particularly accurate characterization, as a substrate may be quite porous but still have limited permeability if the pores are not generally open and interconnected. For example, a Styrofoam drinking cup is formed of a highly porous foam material, but is not permeable to the flow of liquid. Therefore, in considering the importance of porosity and permeability, the pore structure of the substrate must also be examined. In the example of the Styrofoam cup, the Styrofoam material has a closed pore network. This means that the foam contains many non connected and/or closed-ended pores. In this way, there are many voids and open spaces within the foam, but since the pores are not connected, the fluid or gas cannot flow from one side of the foam to the other. As more of the channels begin to interconnect, then fluid paths begin to form from one side to the other. In such a case, the material is said to possess more open pore network. The more connected channels formed through the material, the higher the permeability becomes for the substance. In the case where every pore is connected to at least one other channel, and all pores allow for fluid flow through the entire thickness of the wall formed of the material, the substrate would be defined as having a completely open pore network. It is important to note the difference between cells and pores. Cells refer to the channels that run (generally parallel to each other but not necessarily) through the honeycomb substrate. Often, the honeycomb substrates are referred to in the context of how many cells they have per square inch. For example, a substrate with 200 cells per square inch has 200 channels along the principle axis of the substrate. Pores, on the other hand, refer to the gaps inside the material itself, such as in the material that constitutes the wall separating two parallel channels or cells. Completely or mostly open pore network substrates are not known in the filtering or catalytic industries. Instead, even the most porous available extruded substrates are a hybrid of opened pore and closed pore porosity.

Accordingly, it is highly desirable for many applications that substrates be formed with high porosity, and with an internal pore structure that enables a similarly high permeability. Also, the substrates have to be formed with a sufficiently rigid structure to support the structural and environmental requirements for particular applications. For example, a filter or catalytic converter that is to be attached to internal combustion engine must be able to withstand the likely environmental shock, thermal requirements, and manufacturing and use stresses. Finally, the substrate needs to be produced at a cost low enough to allow for widespread use. For example, in order to affect the level of worldwide pollution from automobiles, a filtering substrate must be affordable and usable in developed as well as developing countries. Accordingly, the overall cost structure to filters and catalytic converter substrates is a substantial consideration in the substrate's design and selected process.

Extrusion has proven to be an efficient and cost-effective process to manufacture rigid substrates of constant cross section. More particularly, extrusion of ceramic powder material is the most widely used process for making filter and catalytic substrates for internal combustion engines. Over the years, the process of extruding powdered ceramics has advanced such that substrates may now be extruded having porosities approaching 60%. These extruded porous substrates have had good strength characteristics, may be flexibly manufactured, may be manufactured at scale, maintain high quality levels, and are very cost-effective. However, extrusion of powdered ceramic material has reached a practical upper limit of porosity, and further increases in porosity appear to result in an unacceptably low strength. For example, as porosity is increased beyond 60%, the extruded ceramic powder substrate has not proven strong enough to operate in the harsh environment of a diesel particulate filter. In another limitation of the known extrusion processes, it has been desired to increase the surface area in a substrate to allow for more efficient catalytic conversion. In order to increase surface area, extruded ceramic powder substrates have tried to increase cell density, but the increase in cell density has resulted in an unacceptable back pressure to the engine. Thus, the extruded ceramic powder substrate does not have sufficient strength at very high porosities, and also produces unacceptable back pressure when there is a need for increased surface area. Accordingly, the extrusion of ceramic powder appears to have reached its practical utility limits.

In an effort to obtain higher porosities, filter suppliers have attempted to move to pleated ceramic papers. Using such pleated ceramic papers, porosities of about 80% are possible with very low back pressure. With such low back pressure, these filters have been used in applications, such as mining, where extremely low back pressure is a necessity. However, the use of the pleated ceramic paper filters has been sporadic, and has not been widely adopted. For example, pleated ceramic papers have not effectively been used in harsh environments. Manufacturing the pleated ceramic papers requires the use of a paper making process that creates ceramic paper structures that are relatively weak, and do not appear to be cost-effective as compared to extruded filters. Telescoping, or unraveling of the pleated paper has been observed in the field, even when the ceramic fibers were coated with tough coatings, such as SiC, using expensive chemical vapor deposition type processes. Further, the formation of pleated ceramic papers allows very little flexibility in cell shape and density. For example, it is difficult to create a paper pleated filter with large inlet channels and smaller outlet channels, which may be desirable in some filtering applications. Accordingly, the use of pleated ceramic papers has not satisfied the requirement for higher porosity filter and catalytic substrates.

In another example of an effort to increase porosity and to avoid the disadvantages of pleated paper, some have built substrates by forming a mass with ceramic precursors and carefully processing the mass to grow mono-crystalline whiskers in a porous pattern. However, growing these crystals in-situ requires careful and accurate control of the curing process, making the process difficult to scale, relatively expensive, and prone to defects. Further, this difficult process only gives a few more percentage points in porosity. Finally, the process only grows a mullite type crystalline whisker, which limits the applicability of the substrate. For example, mullite is known to have a large coefficient of thermal expansion, which makes crystalline mullite whiskers undesirable in many applications needing a wide operational temperature band and sharp temperature transitions.

Accordingly, the industry has a need for a rigid substrate that has high porosity and an associated high permeability. Preferably, the substrate would be formed as a highly desirable open cell network, would be cost-effective to manufacture, and could be manufactured with flexible physical, chemical, and reaction properties.

SUMMARY OF THE INVENTION

Briefly, the present invention provides a highly porous substrate using an extrusion system. More particularly, the present invention enables the production of a highly porous substrate. Depending on the particular mixture, the present invention enables substrate porosities of about 60% to about 90%, and enables advantages at other porosities, as well. The extrusion system enables the use of a wide variety of fibers and additives, and is adaptable to a wide variety of operating environments and applications. Fibers, which have an aspect ratio greater than 1, are selected according to substrate requirements, and are typically mixed with binders, pore-formers, extrusion aids, and fluid to form a homogeneous extrudable mass. The homogeneous mass is extruded into a green substrate. The more volatile material is preferentially removed from the green substrate, which allows the fibers to form interconnected networks. As the curing process continues, inorganic bonds are formed between fibers to produce a structure having a substantially open pore network. The resulting porous substrate is useful in many applications, for example, as a substrate for a filter or catalyst host, or catalytic converter.

In a more specific example, ceramic fibers are selected with an aspect ratio distribution between about 3 and about 1000, although more typically will be in the range of about 3 to about 500. The aspect ratio is the ratio of the length of the fiber divided by the diameter of the fiber. The ceramic fibers are mixed with an organic binder (0% to 20% by weight), an inorganic binder (0% to 30% by weight), a pore former (0% to 60% by weight), and a fluid (10% to 40% by weight) into a homogeneous mass. A shear mixing and kneading process is employed to more fully distribute the fibers evenly in the mass. The ceramic material may be about 8% to about 60% by volume of the mass, which results in a substrate having between about 92% and about 60% porosity. The homogeneous mass is extruded into a green substrate. The binder material is removed from the green substrate, which allows the fibers to overlap and contact. As the curing process continues, inorganic bonds are formed between fibers to produce a rigid open cell network. As used in this description, "curing" is defined to include two important process steps: 1) binder removal and 2) bond formation. The binder removal process removes free water, removes most of the additives, and enables fiber to fiber contact. The resulting porous substrate is useful in many applications, for example, as a substrate for a filter or catalytic converter.

In another specific example, a porous substrate may be produced without the use of pore formers. In this case, the ceramic material may be about 40% to about 60% or more by volume of the mass, which results in a substrate having between about 60% and about 40% porosity. Since no pore former is used, the extrusion process is simplified, and is more cost effective. Also, the resulting structure is a highly desirable substantially open pore network.

Advantageously, the disclosed fiber extrusion system produces a substrate having high porosity, and having an open pore network that enables an associated high permeability, as well as having sufficient strength according to application needs. The fiber extrusion system also produces a substrate with sufficient cost effectiveness to enable widespread use of the resulting filters and catalytic converters. The extrusion system is easily scalable to mass production, and allows for flexible chemistries and constructions to support multitudes of applications. The present invention represents a pioneering use of fiber material in an extrudable mixture. This fibrous extrudable mixture enables extrusion of substrates with very high porosities, at a scalable production, and in a cost-effective manner. By enabling fibers to be used in the repeatable and robust extrusion process, the present invention enables mass production of filters and catalytic substrates for wide use throughout the world.

These and other features of the present invention will become apparent from a reading of the following description, and may be realized by means of the instrumentalities and combinations particularly pointed out in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
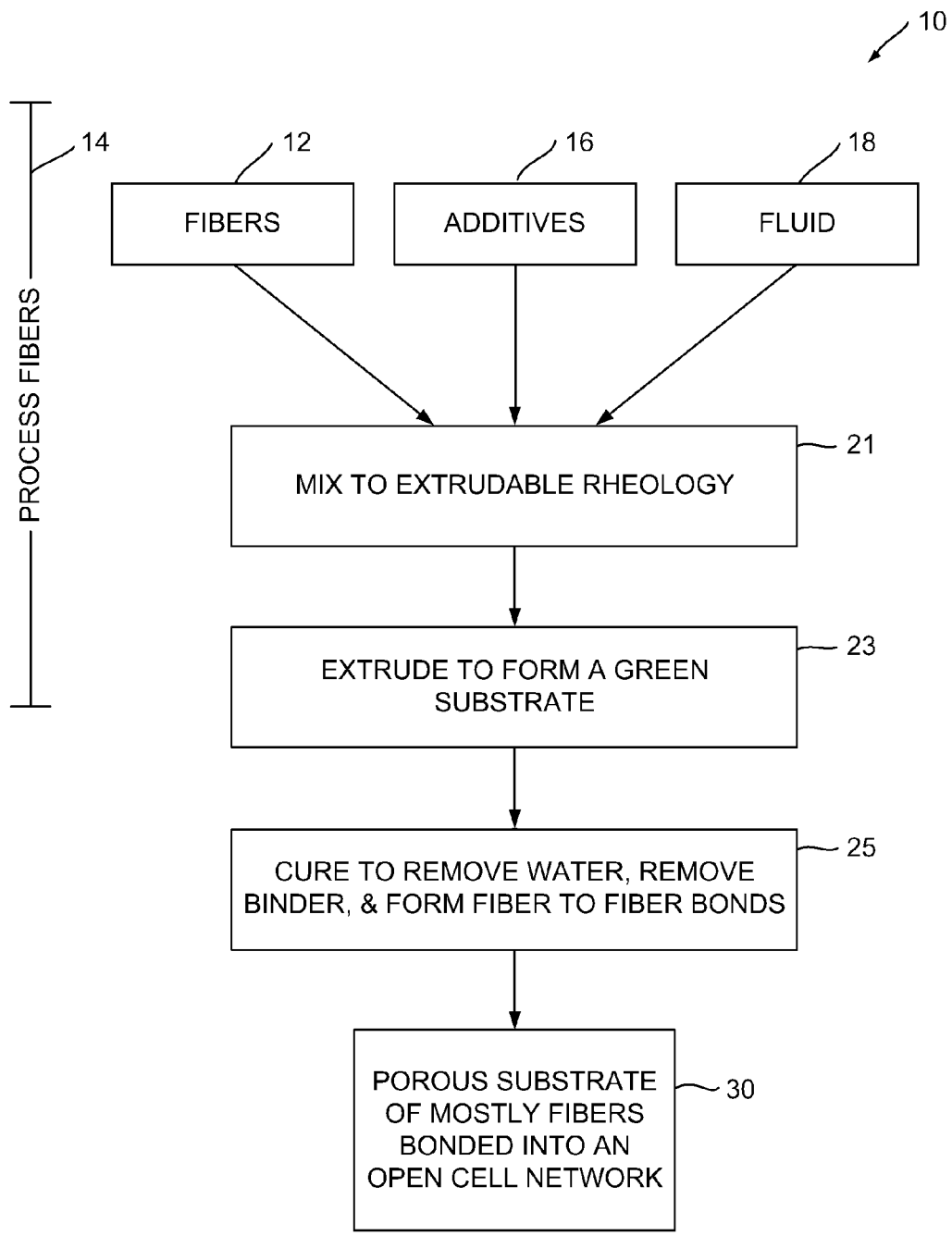
FIG. 1 is a block diagram of a system for extruding a porous substrate in accordance with the present invention.

Referring now to FIG. 1, a system for extruding a porous substrate is illustrated. Generally, system 10 uses an extrusion process to extrude a green substrate that can be cured into the final highly porous substrate product. System 10 advantageously produces a substrate having high porosity, having a substantially open pore network enabling an associated high permeability, as well as having sufficient strength according to application needs. The system 10 also produces a substrate with sufficient cost effectiveness to enable widespread use of the resulting filters and catalytic converters. The system 10 is easily scalable to mass production, and allows for flexible chemistries and constructions to support multitudes of applications.

System 10 enables a highly flexible extrusion process, so is able to accommodate a wide range of specific applications. In using system 10, the substrate designer first establishes the requirements for the substrate. These requirements may include, for example, size, fluid permeability, desired porosity, pore size, mechanical strength and shock characteristics, thermal stability, and chemical reactivity limitations. According to these and other requirements, the designer selects materials to use in forming an extrudable mixture. Importantly, system 10 enables the use of fibers 12 in the formation of an extruded substrate. These fibers may be, for example, ceramic fibers, organic fibers, inorganic fibers, polymeric fibers, oxide fibers, vitreous fibers, glass fibers, amorphous fibers, crystalline fibers, monocrystalline fibers, polycrystalline fibers, non-oxide fibers, carbide fibers, metal fibers, other inorganic fiber structures, or a combination of these. However, for ease of explanation, the use of ceramic fibers will be described, although it will be appreciated that other fibers may be used. Also, the substrate will often be described as a filtering substrate or a catalytic substrate, although other uses are contemplated and within the scope of this teaching. The designer selects the particular type of fiber based upon application specific needs. For example, the ceramic fiber may be selected as a mullite fiber, an aluminum silicate fiber, or other commonly available ceramic fiber material. The fibers typically need to be processed 14 to cut the fibers to a usable length, which may include a chopping process prior to mixing the fibers with additives. Also, the various mixing and forming steps in the extrusion process will further cut the fibers.

According to specific requirements, additives 16 are added. These additives 16 may include binders, dispersants, pore formers, plasticizers, processing aids, and strengthening materials. Also, fluid 18, which is typically water, is combined with the additives 16 and the fibers 12. The fibers, additives, and fluid are mixed to an extrudable rheology 21. This mixing may include dry mixing, wet mixing, and shear mixing. The fibers, additives, and fluid are mixed until a homogeneous mass is produced, which evenly distributes and arranges fibers within the mass. The fibrous and homogenous mass is then extruded to form a green substrate 23. The green substrate has sufficient strength to hold together through the remaining processes.

The green substrate is then cured 25. As used in this description, "curing" is defined to include at least two important process steps: 1) binder removal and 2) bond formation. The binder removal process removes free water, removes most of the additives, and enables fiber to fiber contact. Often the binder is removed using a heating process that burns off the binder, but it will be understood that other removal processes may be used dependent on the specific binder used. For example, some binder may be removed using an evaporation or sublimation process. Some binders and or other organic components may melt before degrading into a vapor phase. As the curing process continues, inorganic bonds are formed between overlapping fibers. These bonds facilitate overall structural rigidity, as well as create the desirable porosity and permeability for the substrate. Accordingly, the cured substrate 30 is a highly porous substrate of mostly fibers bonded into an open pore network 30. The substrate may then be used as a substrate for many applications, including as a substrate for filtering applications and catalytic conversion applications. Advantageously, system 10 has enabled a desirable extrusion process to produce substrates having porosities of up to about 90%.

Figure 2:
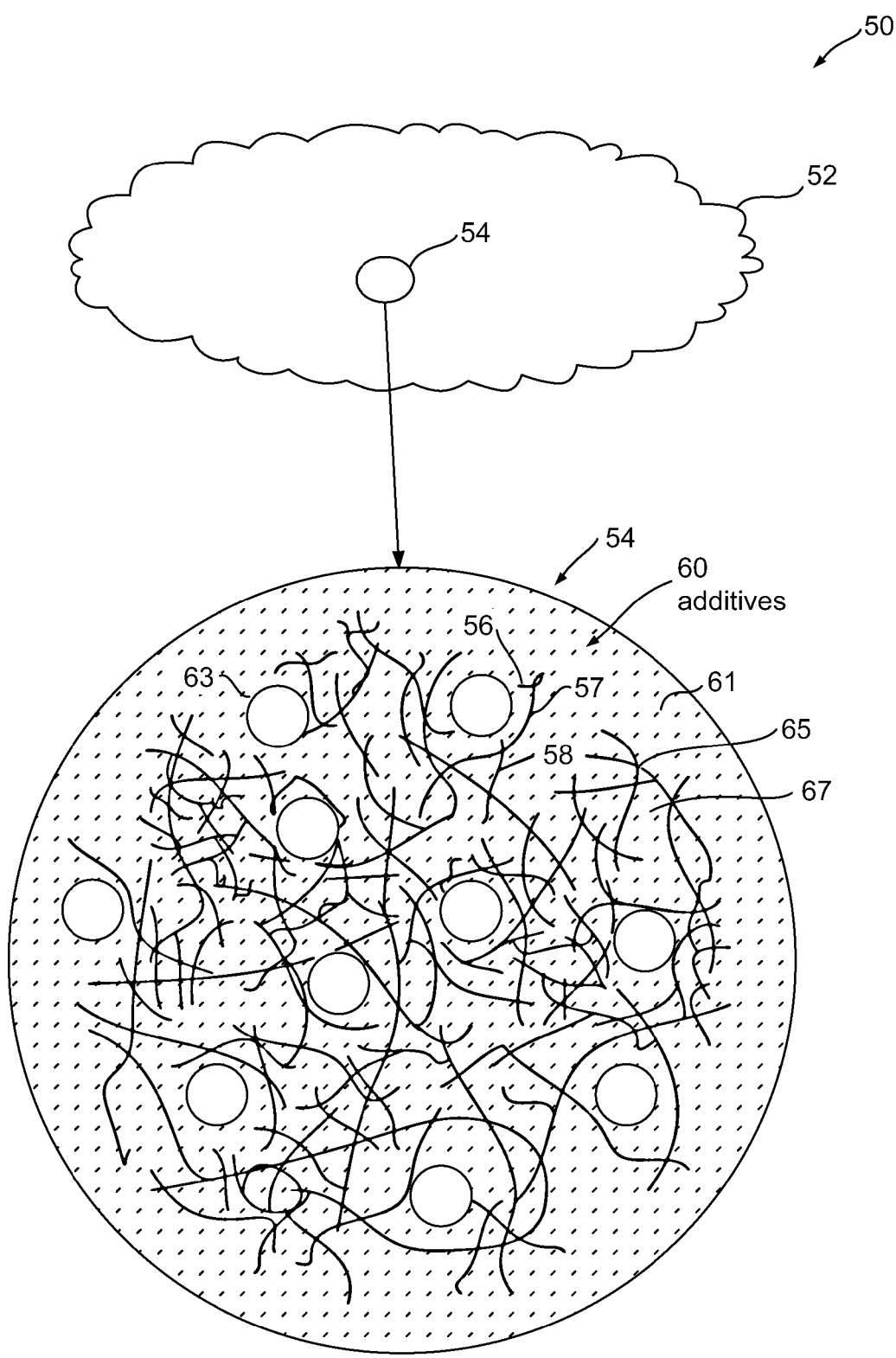
FIG. 2 is an illustration of a fibrous extrudable mixture in accordance with the present invention.

Referring now to FIG. 2, an extrudable material 50 is illustrated. The extrudable material 50 is ready for extrusion from an extruder, such as a piston or screw extruder. The extrudable mixture 52 is a homogeneous mass including fibers, plasticizers, and other additives as required by the specific application. FIG. 2 illustrates an enlarged portion 54 of the homogeneous mass. It will be appreciated that the enlarged portion 54 may not be drawn to scale, but is provided as an aid to this description. The extrudable mixture 52 contains fibers, such as fibers 56, 57, and 58. These fibers have been selected to produce a highly porous and rigid final substrate with desired thermal, chemical, mechanical, and filtration characteristics. As will be appreciated, substantially fibrous bodies have not been considered to be extrudable, since they have no plasticity of their own. However, it has been found that through proper selection of plasticizers and process control, an extrudable mixture 52 comprising fibers may be extruded. In this way, the cost, scale, and flexibility advantages of extrusion may be extended to include the benefits available from using fibrous material.

Generally, a fiber is considered to be a material with a relatively small diameter having an aspect ratio greater than one. The aspect ratio is the ratio of the length of the fiber divided by the diameter of the fiber. As used herein, the 'diameter' of the fiber assumes for simplicity that the sectional shape of the fiber is a circle; this simplifying assumption is applied to fibers regardless of their true sectional shape. For example, a fiber with an aspect ratio of 10 has a length that is 10 times the diameter of the fiber. The diameter of the fiber may be 6 micron, although diameters in the range of about 1 micron to about 25 microns are readily available. It will be understood that fibers of many different diameters and aspect ratios may be successfully used in system 10. As will be described in more detail with reference to later figures, several alternatives exist for selecting aspect ratios for the fibers. It will also be appreciated that the shape of fibers is in sharp contrast to the typical ceramic powder, where the aspect ratio of each ceramic particle is approximately 1.

The fibers for the extrudable mixture 52 may be metallic (some times also referred to as thin-diameter metallic wires), although FIG. 2 will be discussed with reference to ceramic fibers. The ceramic fibers may be in an amorphous state, a vitreous state, a crystalline state, a poly-crystalline state, a mono-crystalline state, or in a glass-ceramic state. In making the extrudable mixture 52, a relatively low volume of ceramic fiber is used to create the porous substrate. For example, the extrudable mixture 52 may have only about 10% to 40% ceramic fiber material by volume. In this way, after curing, the resulting porous substrate will have a porosity of about 90% to about 60%. It will be appreciated that other amounts of ceramic fiber material may be selected to produce other porosity values.

In order to produce an extrudable mixture, the fibers are typically combined with a plasticizer. In this way, the fibers are combined with other selected organic or inorganic additives 60. These additives provide three key properties for the extrudate. First, the additives allow the extrudable mixture to have a rheology proper for extruding. Second, the additives provide the extruded substrate, which is typically called a green substrate, sufficient strength to hold its form and position the fibers until these additives are removed during the curing process. And third, the additives are selected so that they burn off or react in the curing process in a way that facilitates arranging the fibers into an overlapping construction, and in a way that strengthens the porous structure. Inorganic material included as additives 60 in the extruded mixture 52 can react during the curing process to couple overlapping fibers by facilitating the formation of inorganic bonds at or near the intersecting fibers. Typically, the additives 60 will also include a binder, such as binder 61. The binder 61 acts as a medium to hold the fibers into position and provide strength to the green substrate. The fibers and binder(s) may be used to produce a porous substrate having a relatively high porosity. However, to increase porosity even further, additional pore formers, such as pore former 63, may be added. Pore formers are added to increase open space in the final cured substrate. Pore formers may be spherical, elongated, fibrous, or irregular in shape. Pore formers are selected not only for their ability to create open space and based upon their thermal degradation behavior, but also for assisting in orienting the fibers. In this way, the pore formers assist in arranging fibers into an overlapping pattern to facilitate proper bonding between fibers during later stage of the curing. Additionally, pore-formers also play a role in the alignment of the fibers in preferred directions, which affects the thermal expansion of the extruded material and the strength along different axes.

As briefly described above, extrudable mixture 52 may use one or more fibers selected from many types of available fibers. Further, the selected fiber may be combined with one or more binders selected from a wide variety of binders. Also, one or more pore formers may be added selected from a wide variety of pore formers. The extrudable mixture may use water or other fluid as its plasticizing agent, and may have other additives added. This flexibility in formation chemistry enables the extrudable mixture 52 to be advantageously used in many different types of applications. For example, mixture combinations may be selected according to required environmental, temperature, chemical, physical, or other requirement needs. Further, since extrudable mixture 52 is prepared for extrusion, the final extruded product may be flexibly and economically formed. Although not illustrated in FIG. 2, extrudable mixture 52 is extruded through a screw or piston extruder to form a green substrate, which is then cured into the final porous substrate product.

The present invention represents a pioneering use of fiber material in a plastic batch or mixture for extrusion. This fibrous extrudable mixture enables extrusion of substrates with very high porosities, at a scalable production, and in a cost-effective manner. By enabling fibers to be used in the repeatable and robust extrusion process, the present invention enables mass production of filters and catalytic substrates for wide use throughout the world.

Figure 3A:
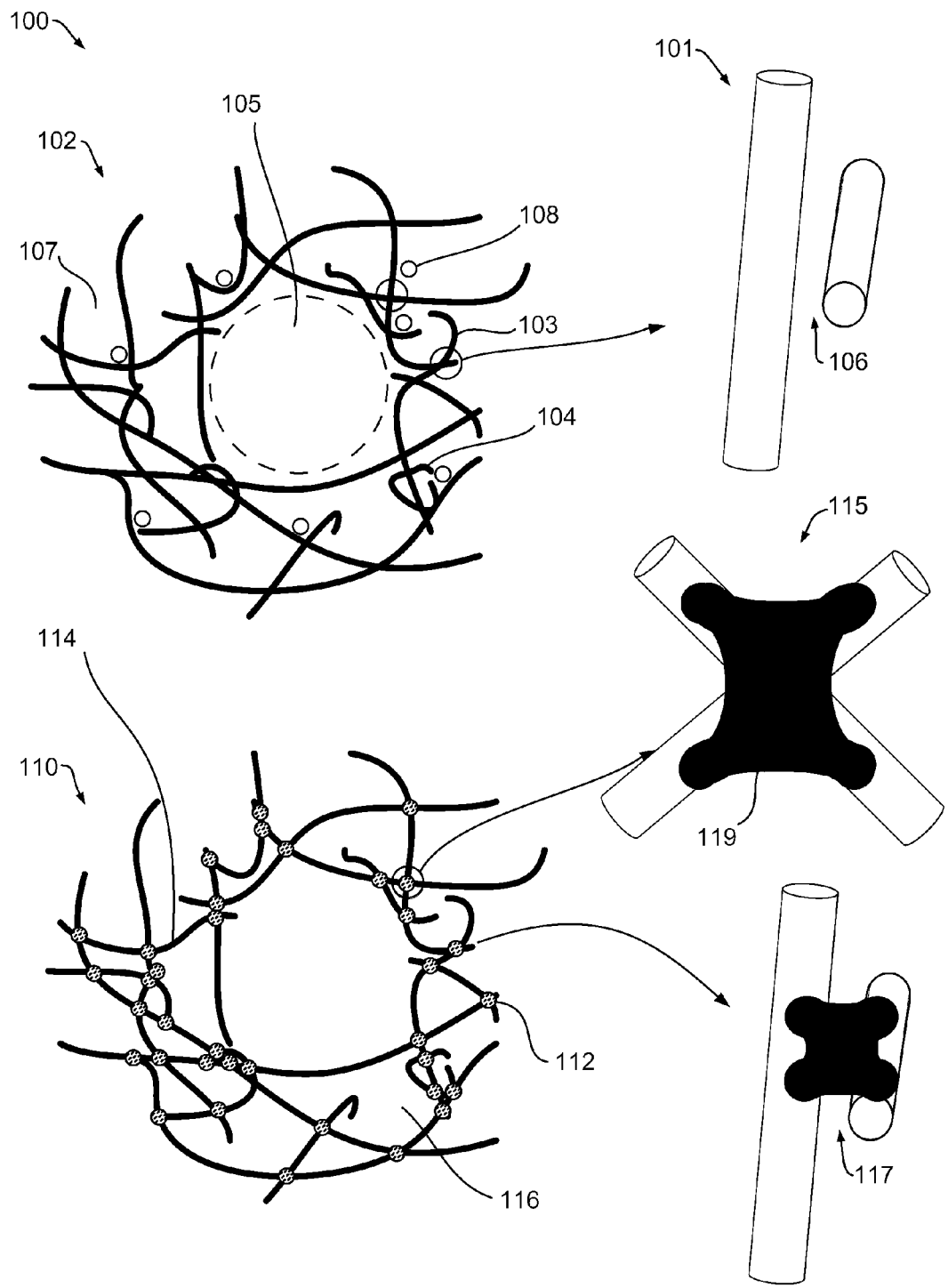
FIGS. 3A and 3B are illustrations of an open cell network in accordance with the present invention.

Referring to FIG. 3A, an enlarged cured area of a porous substrate is illustrated. The substrate portion 100 is illustrated after binder removal 102 and after the curing process 110. After binder removal 102, fibers, such as fiber 103 and 104 are initially held into position with binder material, and as the binder material burns off, the fibers are exposed to be in an overlapping, but loose, structure. Also, a pore former 105 may be positioned to produce additional open space, as well as to align or arrange fibers. Since the fibers only comprise a relatively small volume of the extrudable mixture, many open spaces 107 exist between the fibers. As the binder and pore former is burned off, the fibers may adjust slightly to further contact each other. Overlapping fibers 101 may remain in position or adjust slightly to arrange in close proximity to adjacent fibers, but not actually make contact as shown at 106. The binder and pore formers are selected to burn off in a controlled manner so as not to disrupt the arrangement of the fibers or have the substrate collapse in burn off. Typically, the binder and pore formers are selected to degrade or burn off prior to forming bonds between the fibers. Inorganic binder 108 that is included in the extrudable mixture 52 remains after burning off the binder and pore former. As the curing process continues, the overlapping and touching fibers begin to form bonds and the inorganic binder 108 flows or reacts to form inorganic bonds 119 to couple overlapping fibers. It will be appreciated that the bonds may be formed in several ways. For example, the fibers may be heated to allow the formation of a liquid assisted sintered bond at the intersection or node of the fibers. This liquid state sintering may result from the particular fibers selected, or may result from additional additives added to the mixture or coated on the fibers. In other cases, it may be desirable to form a solid state sintered bond. In this case, the intersecting bonds form a grain structure connecting overlapping fibers. In the green state, the fibers have not yet formed physical bonds to one another, but may still exhibit some degree of green strength due to tangling of the fibers with one another. The particular type of bond selected will be dependent on selection of base materials, desired strength, and operating chemistries and environments. In some cases, the bonds are caused by the presence of the inorganic binder 108 present in the mixture that hold the fibers together in a connected network, and do not burn off during the curing process.

Advantageously, the formation of bonds, such as bonds 112 and inorganic bonds 119 facilitates forming a substantially rigid structure with the fibers. Additionally, overlapping fibers that do not make contact with adjacent fibers are coupled by inorganic bonds, as shown at 117, due to the reaction of the inorganic binder 108 during the curing step. The bonds also enable the formation of an open pore network having very high porosity. For example, open-space 116 is created naturally by the space between fibers. Open space 114 is created as pore former 105 degrades or burns off. In this way, the fiber bond formation process creates an open pore network with no or virtually no terminated channels. This open pore network generates high permeability, high filtration efficiency, and allows high surface area for addition of catalyst, for example. It will be appreciated that the formation of bonds can depend upon the type of bond desired, such as solid-state or liquid-assisted/liquid-state sintering, and additives present during the curing process. For example, the additives, particular fiber selection, the time of heat, the level of heat, and the reaction environment may all be adjusted to create a particular type of bond.

Figure 3B:
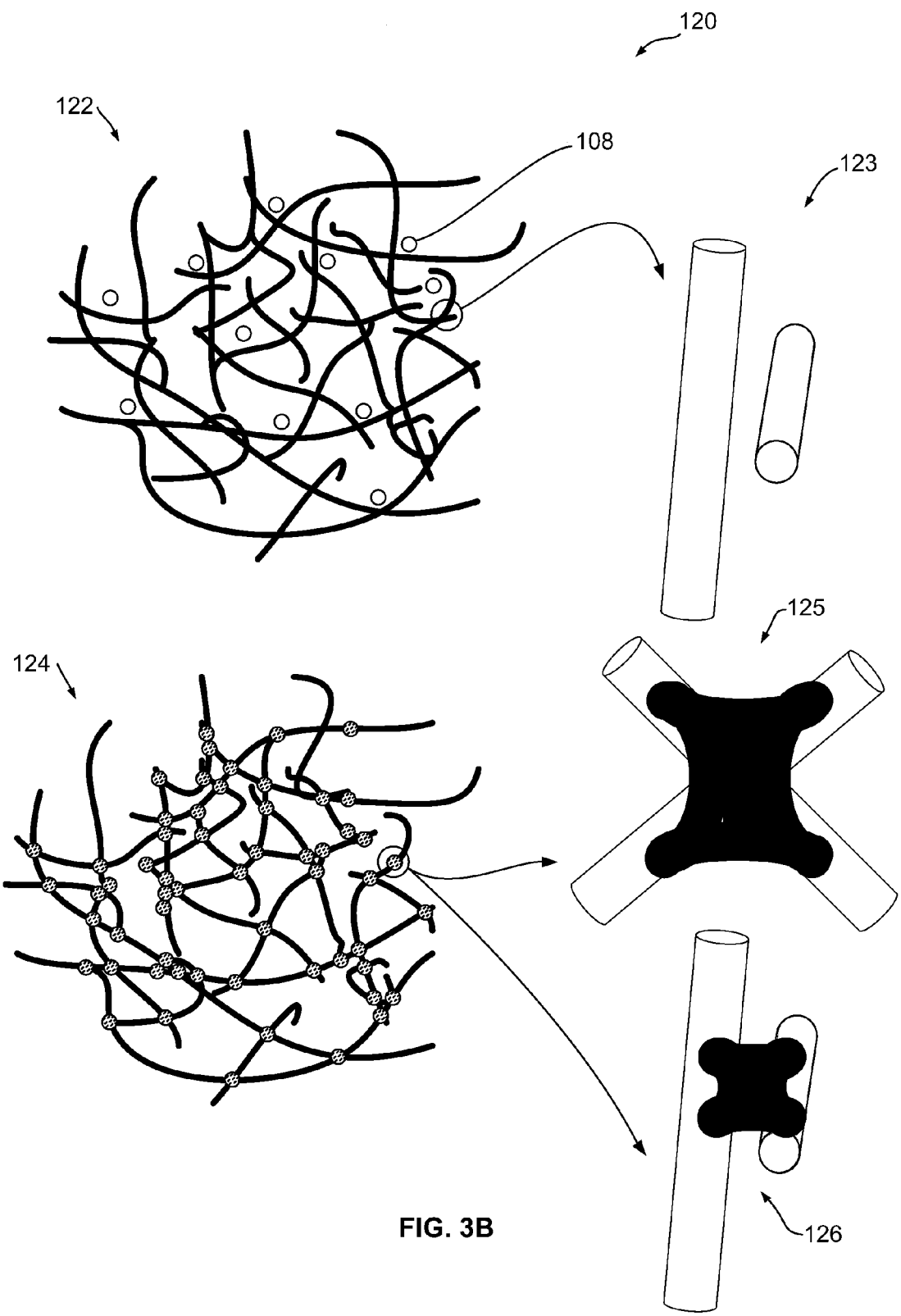

Referring now to FIG. 3B, another enlarged cured area of a porous substrate is illustrated. The substrate portion 120 is illustrated after binder removal 122 and after the curing process 124. The substrate portion 120 is similar to the substrate portion 100 described with reference to FIG. 3A, so will not be described in detail. Inorganic binder 108 remains after burning off the binder, and overlapping fibers may adjust to either contact adjacent fibers or be in close proximity to adjacent fibers, as shown at 123. Substrate 120 has been formed without the use of specific pore formers, so the entire open pore network 124 has resulted from the positioning of the fibers with a binder material. Strength of the porous structure can be maintained through the formation of inorganic bonds between fibers that are in contact with adjacent fibers, as shown at 125, or through bonds between fibers that are in close proximity to adjacent fibers, as shown at 126. In this way, moderately high porosity substrates may be formed without the use of any specific pore formers, thereby reducing the cost and complexity for manufacturing such moderate porosity substrates. It has been found that substrates having a porosity in the range of about 40% to about 60% may be produced in this way.

Figure 4:
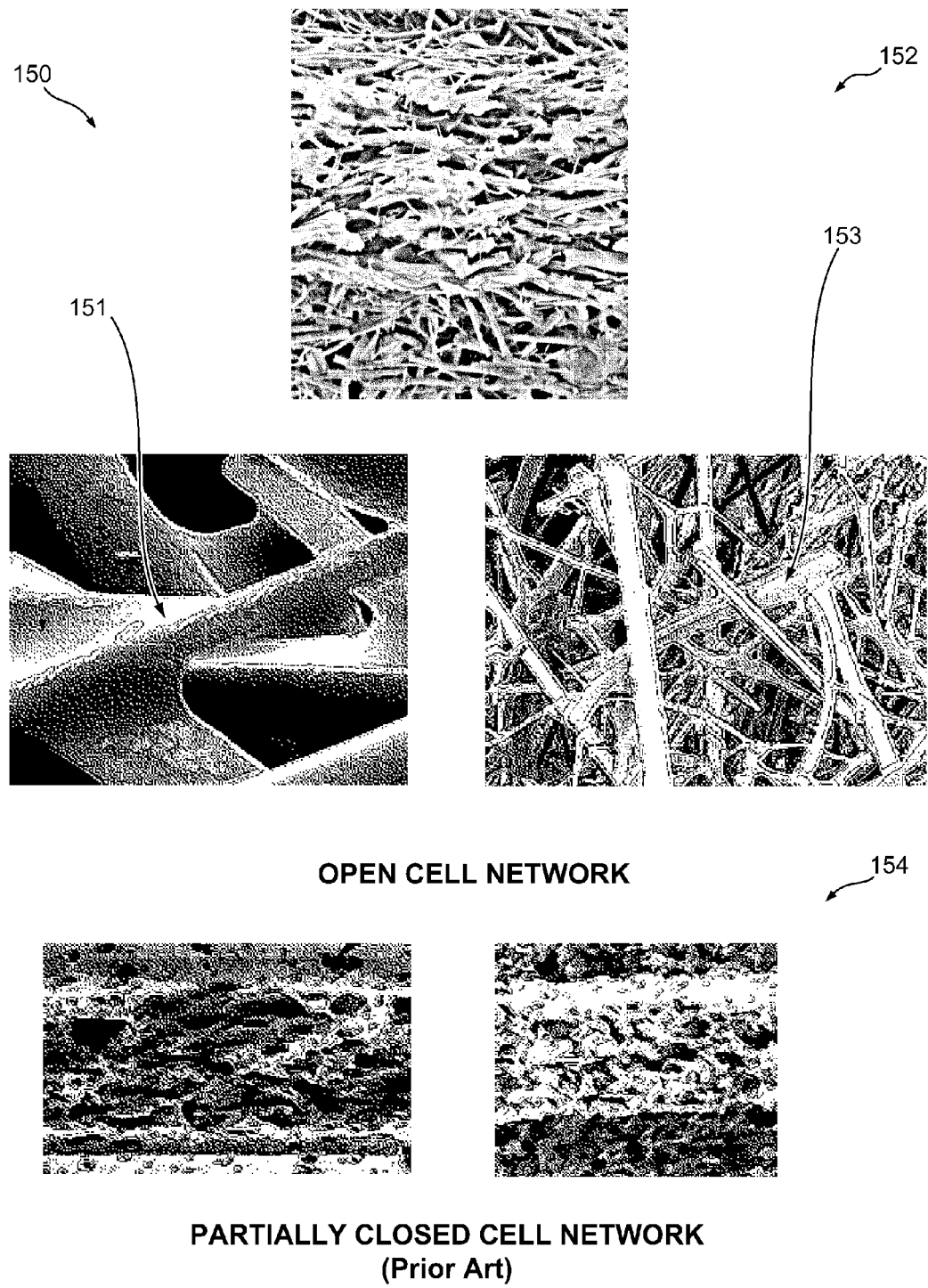
FIG. 4 is an electron microscope picture of an open cell network in accordance with the present invention and a close cell network of the prior art.

Referring now to FIG. 4, an electron microscope picture set 150 is illustrated. Picture set 150 first illustrates an open pore network 152 desirably created using a fibrous extrudable mixture. As can be seen, fibers have formed bonds at intersecting fiber nodes, and pore former and binders have been burned off, leaving a porous open pore network. Inorganic bonds can be seen at 151 and 153 that couple overlapping fibers that result in improved strength of the porous substrate. In sharp contrast, picture 154 illustrates a typical closed cell network made using known prior art processes. The partially closed pore network has a relatively high porosity, but at least some of the porosity is derived from closed channels. These closed channels do not contribute to permeability. In this way, an open pore network and a closed pore network having the same porosity, the open pore network will have a more desirable permeability characteristic.

Figure 5:
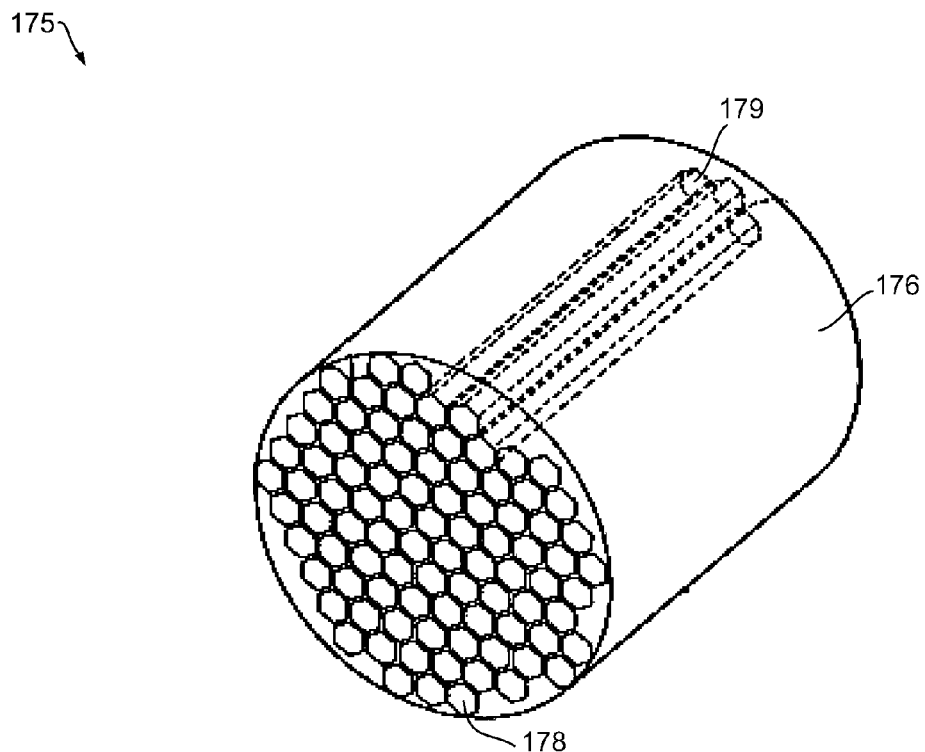
FIG. 5 is an illustration of a filter block using a porous substrate in accordance with the present invention.

The extrudable mixture and process generally described thus far is used to produce a highly advantageous and porous substrate. In one example, the porous substrate may be extruded in to a filter block substrate 175 as illustrated in FIG. 5. Substrate block 175 has been extruded using a piston or screw extruder. The extruder could be conditioned to operate at room temperature, slightly elevated temperature or in a controlled temperature window. Additionally, several parts of the extruder could be heated to different temperatures to affect the slow characteristics, shear history, and gellation characteristics of the extrusion mix. Additionally, the size of the extrusion dies may also be sized accordingly to adjust the expected shrinkage in the substrate during the heating and sintering process. Advantageously, the extrudable mixture was a fibrous extrudable mixture having sufficient plasticizer and other additives to allow extrusion of fibrous material. The extruded green state block was cured to remove free water, burn off additives, and form structural bonds between fibers. The resulting block 175 has highly desirable porosity characteristics, as well as excellent permeability and high usable surface area. Also, depending on the particular fibers and additives selected, the block 175 may be constructed for advantageous depth filtering. The block 176 has channels 179 that extend longitudinally through the block. The inlets to the block 178 may be left open for a flow-through process, or every other opening may be plugged to produce a wall flow effect. Although block 175 is shown with hexagonal channels, it will be appreciated that other patterns and sizes may be used. For example, the channels may be formed with an evenly sized square, rectangular, or triangular channel pattern; a square/rectangular or octagon/square channel pattern having larger inlet channels; or in another symmetrical or asymmetrical channel pattern. The precise shapes and sizes of the channels or cells can be adjusted by adjusting the design of the die. For example, a square channel can be made to have curved corners by using EDM (Electronic Discharge Machining) to shape the pins in the die. Such rounded corners are expected to increase the strength of the final product, despite a slightly higher back-pressure. Additionally, die design can be modified to extrude honeycomb substrates where the walls have different thicknesses and the skin has a different thickness than the rest of the walls. Similarly, in some applications, an external skin may be applied to the extruded substrate for final definition of the size, shape, contour and strength.

When used as a flow-through device, the high porosity of block 176 enables a large surface area for the application of catalytic material. In this way, a highly effective and efficient catalytic converter may be made, with the converter having a low thermal mass. With such a low thermal mass, the resulting catalytic converter has good light off characteristics, and efficiently uses catalytic material. When used in a wall flow or wall filtering example, the high permeability of the substrate walls enable relatively low back pressures, while facilitating depth filtration. This depth filtration enables efficient particulate removal, as well as facilitates more effective regeneration. In some case, however, mostly cake or surface filtration is observed. In wall-flow design, the fluid flowing through the substrate is forced to move through the walls of the substrate, hence enabling a more direct contact with the fibers making up the wall. Those fibers present a high surface area for potential reactions to take place, such as if a catalyst is present. Since the extrudable mixture may be formed from a wide variety of fibers, additives, and fluids, the chemistry of the extrudable mixture may be adjusted to generate a block having specific characteristics. For example, if the final block is desired to be a diesel particulate filter, the fibers are selected to account for safe operation even at the extreme temperature of an uncontrolled regeneration. In another example, if the block is going to be used to filter a particular type of exhaust gas, the fiber and bonds are selected so as not to react with the exhaust gas across the expected operational temperature range. Although the advantages of the high porosity substrate have been described with reference to filters and catalytic converters, it will be appreciated that many other applications exist for the highly porous substrate.

Figure 6:
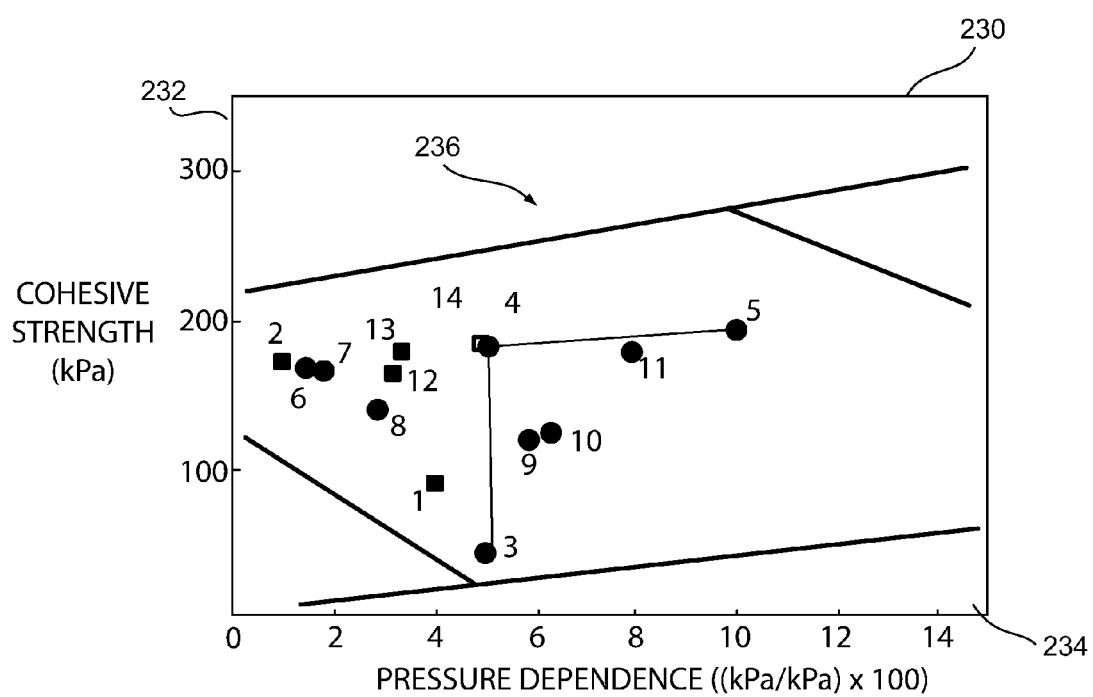
FIG. 6 are tables of fibers, binders, pore formers, fluids, and rheologies useful with the present invention.

The fibrous extrudable mixture as described with reference to FIG. 2 may be formed from a wide variety of base materials. The selection of the proper materials is generally based on the chemical, mechanical, and environmental conditions that the final substrate must operate in. Accordingly, a first step in designing a porous substrate is to understand the final application for the substrate. Based on these requirements, particular fibers, binders, pore formers, fluids, and other materials may be selected. It will also be appreciated that the process applied to the selected materials may affect the final substrate product. Since the fiber is the primary structural material in the final substrate product, the selection of the fiber material is critical for enabling the final substrate to operate in its intended application. Accordingly, the fibers are selected according to the required bonding requirements, and a particular type of bonding process is selected. The bonding process may be a liquid state sintering, solid-state sintering, or a bonding requiring a bonding agent, such as glass-former, glass, clays, ceramics, ceramic precursors or colloidal sols. The bonding agent may be part of one of the fiber constructions, a coating on the fiber, or a component in one of the additives. It will also be appreciated that more than one type of fiber may be selected. It will also be appreciated that some fibers may be consumed during the curing and bonding process. In selecting the fiber composition, the final operating temperature is an important consideration, so that thermal stability of the fiber may be maintained. In another example, the fiber is selected so that it remains chemically inert and unreactive in the presence of expected gases, liquids, or solid particulate matter. The fiber may also be selected according to its cost, and some fibers may present health concerns due to their small sizes, and therefore their use may be avoided. Depending upon the mechanical environment, the fibers are selected according to their ability to form a strong rigid structure, as well as maintain the required mechanical integrity. It will be appreciated that the selection of an appropriate fiber or set of fibers may involve performance and application trade-offs. FIG. 6, Table 1, shows several types of fibers that may be used to form a fibrous extrudable mixture. Generally, the fibers may be oxide or non-oxide ceramic, glass, organic, inorganic, or they may be metallic. For ceramic materials, the fibers may be in different states, such as amorphous, vitreous, poly-crystalline or mono-crystalline. Although Table 1 illustrates many available fibers, it will be appreciated that other types of fibers may be used.

Binders and pore formers may then be selected according to the type of fibers selected, as well as other desired characteristics. In one example, the binder is selected to facilitate a particular type of liquid state bonding between the selected fibers. More particularly, the binder has a component, which at a bonding temperature, reacts to facilitate the flow of a liquid bond to the nodes of intersecting fibers. Also, the binder is selected for its ability to plasticize the selected fiber, as well as to maintain its green state strength. In one example, the binder is also selected according to the type of extrusion being used, and the required temperature for the extrusion. For example, some binders form a gelatinous mass when heated too much, and therefore may only be used in lower temperature extrusion processes. In another example, the binder may be selected according to its impact on shear mixing characteristics. In this way, the binder may facilitate chopping fibers to the desired aspect ratio during the mixing process. The binder may also be selected according to its degradation or burnoff characteristics. The binder needs to be able to hold the fibers generally into place, and not disrupt the forming fiber structure during burnoff. For example, if the binder burns off too rapidly or violently, the escaping gases may disrupt the forming structure. Also, the binder may be selected according to the amount of residue the binder leaves behind after burnout. Some applications may be highly sensitive to such residue.

Pore formers may not be needed for the formation of relatively moderate porosities. For example, the natural arrangement and packing of the fibers within the binder may cooperate to enable a porosity of about 40% to about 60%. In this way, a moderate porosity substrate may be generated using an extrusion process without the use of pore formers. In some cases, the elimination of pore formers enables a more economical porous substrate to be manufactured as compared to known processes. However, when a porosity of more than about 60% is required, pore formers may be used to cause additional airspace within the substrate after curing. The pore formers also may be selected according to their degradation or burnoff characteristics, and also may be selected according to their size and shape. Pore size may be important, for example, for trapping particular types of particulate matter, or for enabling particularly high permeability. The shape of the pores may also be adjusted, for example, to assist in proper alignment of the fibers. For example, a relatively elongated pore shape may arrange fibers into a more aligned pattern, while a more irregular or spherical shape may arrange the fibers into a more random pattern.

The fiber may be provided from a manufacturer as a chopped fiber, and used directly in the process, or a fiber may be provided in a bulk format, which is typically processed prior to use. Either way, process considerations should take into account how the fiber is to be processed into its final desirable aspect ratio distribution. Generally, the fiber is initially chopped prior to mixing with other additives, and then is further chopped during the mixing, shearing, and extrusion steps. However, extrusion can also be carried out with unchopped fibers by setting the rheology to make the extrusion mix extrudable at reasonable extrusion pressures and without causing dilatency flows in the extrusion mix when placed under pressure at the extrusion die face. It will be appreciated that the chopping of fibers to the proper aspect ratio distribution may be done at various points in the overall process. Once the fiber has been selected and chopped to a usable length, it is mixed with the binder and pore former. This mixing may first be done in a dry form to initiate the mixing process, or may be done as a wet mix process. Fluid, which is typically water, is added to the mixture. In order to obtain the required level of homogeneous distribution, the mixture is shear mixed through one or more stages. The shear mixing or dispersive mixing provides a highly desirable homogeneous mixing process for evenly distributing the fibers in the mixture, as well as further cutting fibers to the desired aspect ratio.

FIG. 6 Table 2 shows several binders available for selection. It will be appreciated that a single binder may be used, or multiple binders may be used. The binders are generally divided into organic and inorganic classifications. The organic binders generally will burn off at a lower temperature during curing, while the inorganic binders will typically form a part of the final structure at a higher temperature. Although several binder selections are listed in Table 2, it will be appreciated that several other binders may be used, for example, inorganic binders that can be selected to facilitate inorganic bonds can also include colloidal: aluminosilicate, silica, alumina, zirconium dioxide, titanium dioxide, and others, including sodium silicate, borosilicate, aluminophosphate and calcium cement. Additionally, ceramic precursors, such as tetraethoxysilane, can be added as inorganic binders to facilitate inorganic bonds between fibers. FIG. 6 Table 3 shows a list of pore formers available. Pore formers may be generally defined as organic or inorganic, with the organic typically burning off at a lower temperature than the inorganic. Although several pore formers are listed in Table 3, it will be appreciated that other pore formers may be used. FIG. 6 Table 4 shows different fluids that may be used. Although it will be appreciated that water may be the most economical and often used fluid, some applications may require other fluids. Although Table 4 shows several fluids that may be used, it will be appreciated that other fluids may be selected according to specific application and process requirements.

In general, the mixture may be adjusted to have a rheology appropriate for advantageous extrusion. Typically, proper rheology results from the proper selection and mixing of fibers, binders, dispersants, plasticizers, pore formers, and fluids. A high degree of mixing is needed to adequately provide plasticity to the fibers. Once the proper fiber, binder, and pore former have been selected, the amount of fluid is typically finally adjusted to meet the proper rheology. A proper rheology may be indicated, such as by one of two tests. The first test is a subjective, informal test where a bead of mixture is removed and formed between the fingers of a skilled extrusion operator. The operator is able to identify when the mixture properly slides between the fingers, indicating that the mixture is in a proper condition for extrusion. A second more objective test relies on measuring physical characteristics of the mixture. Generally, the shear strength versus compaction pressure can be measured using a confined (i.e. high pressure ) annular rheometer. Measurements are taken and plotted according to a comparison of cohesion strength versus pressure dependence. By measuring the mixture at various mixtures and levels of fluid, a rheology chart identifying rheology points may be created. For example, Table 5 FIG. 6 illustrates a rheology chart for a fibrous ceramic mixture. Axis 232 represents cohesion strength and axis 234 represents pressure dependence. The extrudable area 236 represents an area where fibrous extrusion is highly likely to occur. Therefore, a mixture characterized by any measurement falling within area 236 is likely to successfully extrude. Of course, it will be appreciated that the rheology chart is subject to many variations, and so some variation in the positioning of area 236 is to be expected. Additionally, several other direct and indirect tests for measuring rheology and plasticity do exist, and it is appreciated that any number of them can be deployed to check if the mixture has the right rheology for it to be extruded into the final shape of the product desired.

Once the proper rheology has been reached, the mixture is extruded through an extruder. The extruder may be a piston extruder, a single screw extruder, or a twin screw extruder. The extruding process may be highly automated, or may require human intervention. The mixture is extruded through a die having the desired cross sectional shape for the substrate block. The die has been selected to sufficiently form the green substrate. In this way, a stable green substrate is created that may be handled through the curing process, while maintaining its shape and fiber alignment.

The green substrate is then dried and cured. The drying can take place in room conditions, in controlled temperature and humidity conditions (such as in controlled ovens), in microwave ovens, RF ovens, and convection ovens. Curing generally requires the removal of free water to dry the green substrate. It is important to dry the green substrate in a controlled manner so as not to introduce cracks or other structural defects. The temperature may then be raised to burn off additives, such as binders and pore formers. The temperature is controlled to assure the additives are burnt off in a controlled manner. It will be appreciated that additive burn off may require cycling of temperatures through various timed cycles and various levels of heat. Once the additives are burned off, the substrate is heated to the required temperature to form structural bonds at fiber intersection points or nodes. The required temperature is selected according to the type of bond required and the chemistry of the fibers. For example, liquid-assisted sintered bonds are typically formed at a temperature lower than solid state bonds. It will also be appreciated that the amount of time at the bonding temperature may be adjusted according to the specific type of bond being produced. The entire thermal cycle can be performed in the same furnace, in different furnaces, in batch or continuous processes and in air or controlled atmosphere conditions. After the fiber bonds have been formed, the substrate is slowly cooled down to room temperature. It will be appreciated that the curing process may be accomplished in one oven or multiple ovens/furnaces, and may be automated in a production ovens/furnaces, such as tunnel kilns.

Figure 7:
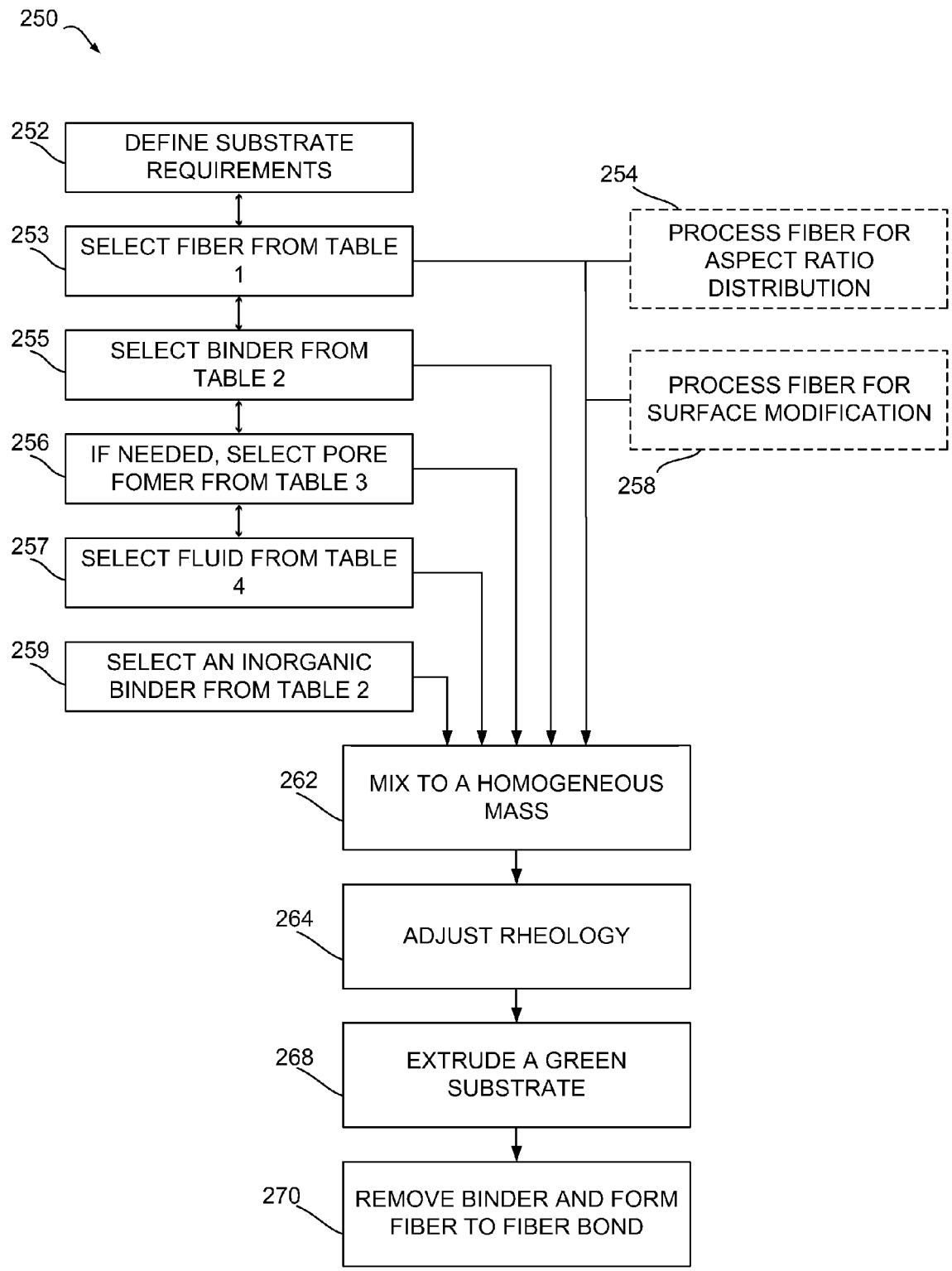
FIG. 7 is a block diagram of a system for extruding a porous substrate in accordance with the present invention.

Referring now to FIG. 7, a system for extruding a porous substrate is illustrated. System 250 is a highly flexible process for producing a porous substrate. In order to design the substrate, the substrate requirements are defined as shown in block 252. For example, the final use of the substrate generally defines the substrate requirements, which may include size constraints, temperature constraints, strength constraints, and chemical reaction constraints. Further, the cost and mass manufacturability of the substrate may determine and drive certain selections. For example, a high production rate may entail the generation of relatively high temperatures in the extrusion die, and therefore binders are selected that operate at an elevated temperature without hardening or gelling. In extrusions using high temperature binders, the dies and barrel may need to be maintained at a relatively higher temperature such as 60 to 180 C. In such a case, the binder may melt, reducing or eliminating the need for additional fluid. In another example, a filter may be designed to trap particulate matter, so the fiber is selected to remain unreactive with the particulate matter even at elevated temperatures. It will be appreciated that a wide range of applications may be accommodated, with a wide range of possible mixtures and processes. One skilled in the art will appreciate the trade-offs involved in the selection of fibers, binders, pore formers, fluids, and process steps. Indeed, one of the significant advantages of system 250 is its flexibility as to the selection of mixture composition and the adjustments to the processes.

Once the substrate requirements have been defined, a fiber is selected from Table 1 of FIG. 6 as shown in block 253. The fiber may be of a single type, or may be a combination of two or more types. It will also be appreciated that some fibers may be selected to be consumed during the curing process. Also, additives may be added to the fibers, such as coatings on the fibers, to introduce other materials into the mixture. For example, dispersant agents may be applied to fibers to facilitate separation and arrangement of fibers, or bonding aids may be coated onto the fibers. In the case of bonding aids, when the fibers reach curing temperatures, the bonding aids assist the formation and flowing of liquid state bonds.

A typical composition to get >80% porosity

| | | Density (g/cc) | Mass (g) | Volume (cc) | Volume (%) |
|---|---|---|---|---|---|
| Fiber | Mullite | 3.50 | 300.0 | 85.74 | 11.21 |
| Inorganic Binder | Bentonite | 2.89 | 30.0 | 10.38 | 1.36 |
| | Colloidal Silica | 4.40 | 120.0 | 27.3 | 3.57 |
| Organic Binder | HPMC (Hydroxypropyl methylcellulose) | 1.30 | 96.0 | 73.86 | 9.66 |
| Pore Former | Carbon (Graphite) | 2.20 | 390.0 | 177.30 | 23.19 |
| Fluid | Water | 1.00 | 390.0 | 390.00 | 51.01 |
| Total | | | 1326.0 | 764.58 | 100.0 |

A binder is then selected from Table 2 of FIG. 6 as shown in block 255. The binder is selected to facilitate green state strength, as well as controlled burn off. Also, the binder is selected to produce sufficient plasticity in the mixture. If needed, a pore former is selected from Table 3 of FIG. 6 as shown in block 256. In some cases, sufficient porosity may be obtained through the use of fibers and binders only. The porosity is achieved not only by the natural packing characteristics of the fibers, but also by the space occupied by the binders, solvents and other volatile components which are released during the de-binding and curing stages. To achieve higher porosities, additional pore formers may be added. Pore formers are also selected according to their controlled burn off capabilities, and may also assist in plasticizing the mixture. Fluid, which is typically water, is selected from Table 4 FIG. 6 as shown in block 257. An inorganic binder is selected from Table 2 of FIG. 6 as shown in block 259. Other liquid materials may be added, such as a dispersant, for assisting in separation and arrangement of fibers, and plasticizers and extrusion aids for improving flow behavior of the mixture. This dispersant may be used to adjust the surface electronic charges on the fibers. In this way, fibers may have their charge controlled to cause individual fibers to repel each other. This facilitates a more homogeneous and random distribution of fibers. A typical composition for mixture intended to create a substrate with >80% porosity is shown below. It will be appreciated that the mixture may be adjusted according to target porosity, the specific application, and process considerations.

As shown in block 254, the fibers selected in block 252 should be processed to have a proper aspect ratio distribution. This aspect ratio is preferred to be in the range of about 3 to about 500 and may have one or more modes of distribution. It will be appreciated that other ranges may be selected, for example, to about an aspect ratio of 1000. In one example, the distribution of aspect ratios may be randomly distributed throughout the desired range, and in other examples the aspect ratios may be selected at more discrete mode values. It has been found that the aspect ratio is an important factor in defining the packing characteristics for the fibers. Accordingly, the aspect ratio and distribution of aspect ratios is selected to implement a particular strength and porosity requirement. Also, it will be appreciated that the processing of fibers into their preferred aspect ratio distribution may be performed at various points in the process. For example, fibers may be chopped by a third-party processor and delivered at a predetermined aspect ratio distribution. In another example, the fibers may be provided in a bulk form, and processed into an appropriate aspect ratio as a preliminary step in the extrusion process. It will be appreciated that the mixing, shear mixing or dispersive mixing, and extrusion aspects of process 250 may also contribute to cutting and chopping of the fibers. Accordingly, the aspect ratio of the fibers introduced originally into the mixture will be different than the aspect ratio in the final cured substrate. Accordingly, the chopping and cutting effect of the mixing, shear mixing, and extrusion should be taken into consideration when selecting the proper aspect ratio distribution 254 introduced into the process.

With the fibers processed to the appropriate aspect ratio distribution, the fibers, binders, pore formers, and fluids are mixed to a homogeneous mass as shown in block 262. This mixing process may include a drying mix aspect, a wet mix aspect, and a shear mixing aspect. It has been found that shear or dispersive mixing is desirable to produce a highly homogeneous distribution of fibers within the mass. This distribution is particularly important due to the relatively low concentration of ceramic material in the mixture. As the homogeneous mixture is being mixed, the rheology of the mixture may be adjusted as shown in block 264. As the mixture is mixed, its rheology continues to change. The rheology may be subjectively tested, or may be measured to comply with the desirable area as illustrated in Table 5 of FIG. 6. Mixture falling within this desired area has a high likelihood of properly extruding. The mixture is then extruded into a green substrate as shown in block 268. In the case of screw extruders, the mixing may also happen inside the extruder itself, and not in a separate mixer. In such cases, the shear history of the mixture has to be carefully managed and controlled. The green substrate has sufficient green strength to hold its shape and fiber arrangement during the curing process. The green substrate is then cured as shown the block 270. The curing process includes removal of any remaining water, controlled burn off of most additives, and the forming of inorganic bonds. During the burn off process, the fibers maintain their tangled and intersecting relationship, and as the curing process proceeds, bonds are formed at the intersecting points or nodes. It will be appreciated that the bonds may result from a liquid state or a solid-state bonding process. Also, it will be understood that some of the bonds may be due to reactions with additives provided in the binder, pore formers, as coatings on the fibers, or in the fibers themselves. After bonds have been formed, the substrate is slowly cooled to room temperature.

Figure 8:
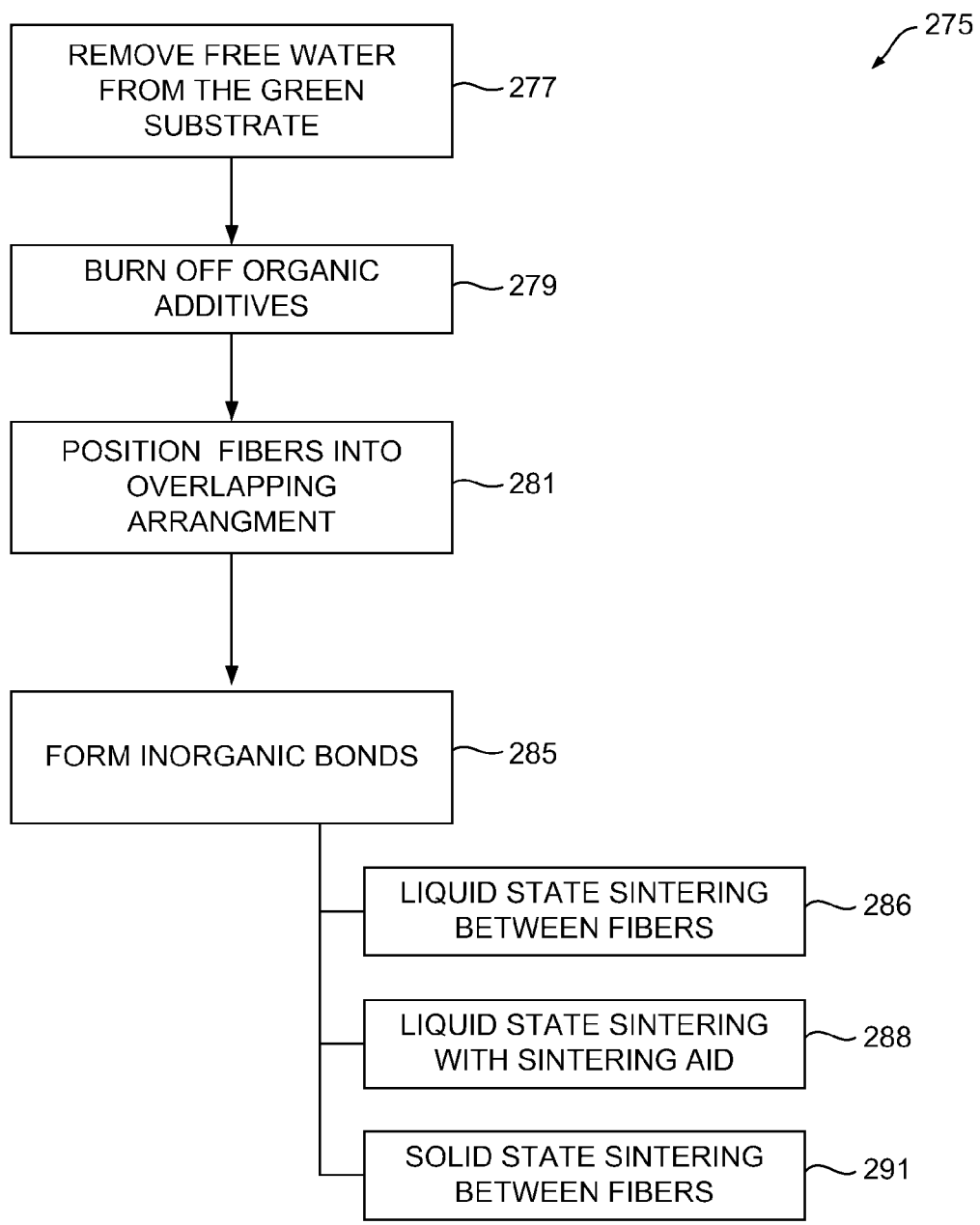
FIG. 8 is a block diagram of a system for curing a porous substrate in accordance with the present invention.

Referring now to FIG. 8, a method for curing a porous fibrous substrate is illustrated. Method 275 has a green substrate having a fibrous ceramic content. The curing process first slowly removes remaining water from the substrate as shown in block 277. Typically, the removal of water may be done at a relatively low temperature in an oven. After the remaining water has been removed, the organic additives may be burnt off as shown in block 279. These additives are burnt off in a controlled manner to facilitate proper arrangement of the fibers, and to ensure that escaping gases and residues do not interfere with the fiber structure. As the additives burn off, the fibers maintain their overlapping arrangement, and may further contact at intersecting points or nodes as shown in block 281. The fibers have been positioned into these overlapping arrangements using the binder, and may have particular patterns formed through the use of pore formers. In some cases, inorganic additives may have been used, which may combine with the fibers, be consumed during the bond forming process, or remain as a part of the final substrate structure. The curing process proceeds to form inorganic bonds as shown in block 285. The specific timing and temperature required to create the bonds depends on the type of fibers used, type of bonding aides or agents used, and the type of desired bond. In one example, the bond may be a liquid state sintered bond generated between fibers as shown in block 286. Such bonds are assisted by glass-formers, glasses, ceramic pre-cursors or inorganic fluxes present in the system. In another example, a liquid state sintered bond may be created using sintering aides or agents as shown in block 288. The sintering aides may be provided as a coating on the fibers, as additives, from binders, from pore formers, or from the chemistry of the fibers themselves. Also, the inorganic bond may be formed by a solid-state sintering between fibers as shown in block 291. In this case, the intersecting fibers exhibit grain growth and mass transfer, leading to the formation of chemical bonds at the nodes and an overall rigid structure. In the case of liquid state sintering, a mass of bonding material accumulates at intersecting nodes of the fibers, and forms the rigid structure. It will be appreciated that the curing process may be done in one or more ovens, and may be automated in an industrial tunnel or kiln type furnace.

Figure 9:
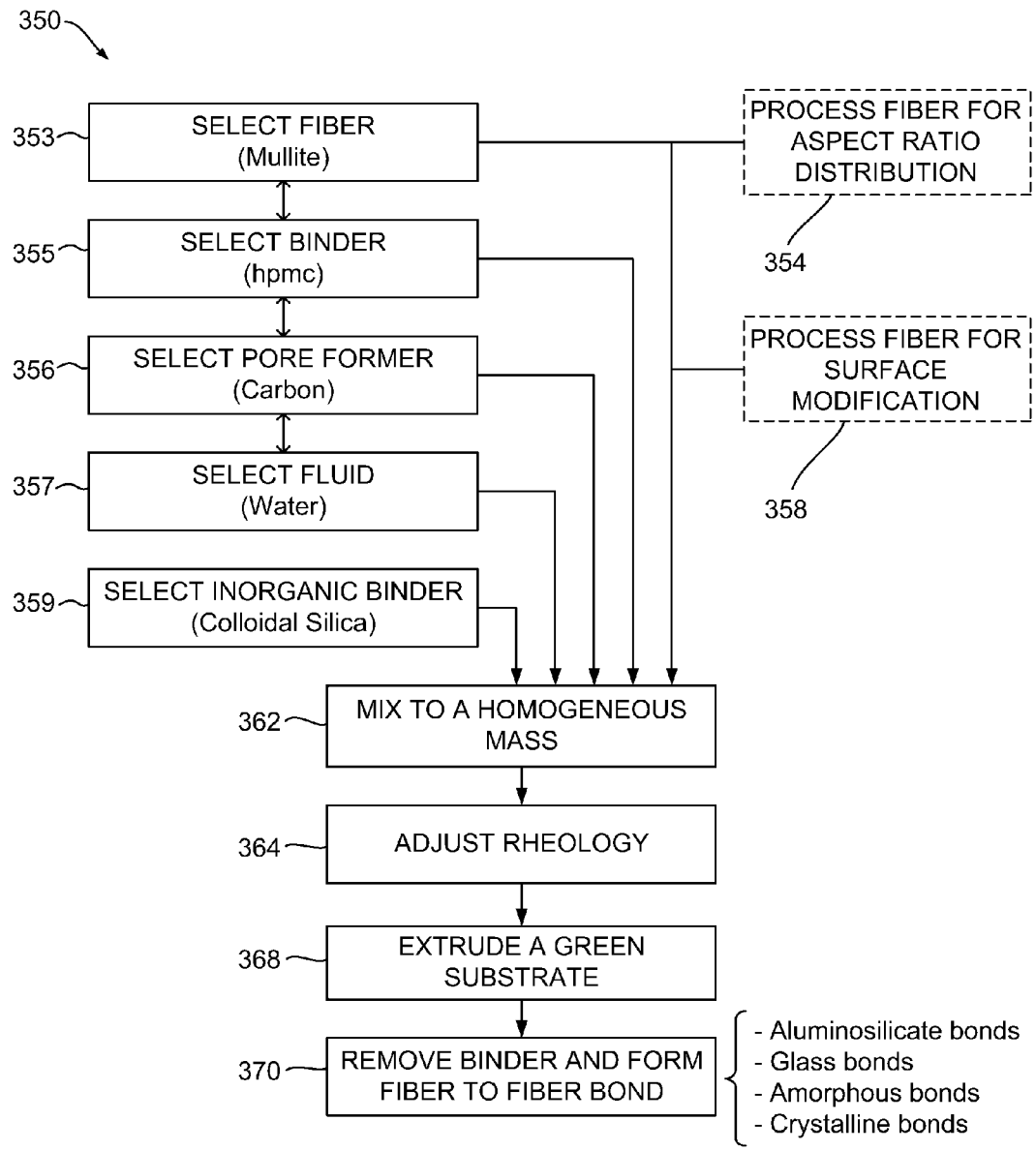
FIG. 9 is a block diagram of an illustrative embodiment of a method for producing a porous substrate in accordance with the present invention.

Referring now to FIG. 9, an illustrative embodiment of a method of producing a porous substrate 350 is shown. In this embodiment, mullite fiber is selected at block 353 due to its exceptional high temperature properties, such as high resistance to thermal shock and thermal stress distribution arising from its low coefficient of thermal expansions, good strength and interlocking grain structure. Mullite is also characterized by relatively low thermal conductivity and high wear resistance. These properties do not suffer much at elevated temperatures, allowing the porous substrate to remain useable at high temperatures. Mullite is the mineralogical name given to the only chemically stable intermediate phase in the $SiO_2$—$Al_2O_3$ system. The natural mineral is rare, though found on the Isle of Mull off the west coast of Scotland. Mullite is commonly denoted as $3Al_2O_3 \cdot 2\,SiO_2$ (i.e., 60 mol % $Al_2O_3$ and 40 mol % $SiO_2$). However, this is misleading since mullite is actually a solid solution with the equilibrium composition limits of between about 60 and 63 mol % alumina below 1600 degrees Celsius. As shown in block 354, the fiber is optionally processed to have a proper aspect ratio distribution. This aspect ratio is preferred to be in the range of about 3 to about 500 and may have one or more modes of distribution. It will be appreciated that other ranges may be selected, for example to about an aspect ration of 1000. In one example, the distribution of aspect ratios may be randomly distributed throughout the desired range, and in other examples the aspect ratios may be selected at more descrete mode values. It has been found that the aspect ratio is an important factor in defining the packing characteristics for the fibers. Accordingly, the aspect ratio and distribution of aspect ratios is selected to implement a particular strength and porosity requirement. Also, it will be appreciated that the processing the mullite fibers into a desired aspect ration distribution may be performed at various points in the process, such as by a fiber supplier, or as a preliminary processing step before mixing. It will be appreciated that mixing, shear mixing, or dispersive mixing, and subsequent extrusion processing during the process 350 may contribute to the cutting and chopping of the fibers. Accordingly, the aspect ratio of the fibers introduced into the mixture will be different than the aspect ratio of the fibers in the final cured porous substrate. Further, optional step 358 can be performed to process the mullite fiber for surface modification through the addition of other materials, such as a dispersant, for assisting in the separation and arrangement of fibers, and plasticizers and extrusion aids for improving flow behaviour of the mixture. This dispersant may be used to adjust the surface electronic charges on the fibers. In this way, fibers may have their charge controlled to cause individual fibers to repel each other. This facilitates a more homogeneous and random distribution of fibers.

Referring still to FIG. 9, hydroxypropyl methylcellulose (HPMC) is suggested for use as the binder at block 355 in order to produce sufficient plasticity in the mixture. Graphite is used for the pore former at block 356 to increase porosity by occupying space during mixing and extrusion, while degrading in the presence of oxygen during the subsequent curing process. Water is used as the fluid at block 359, and colloidal silica is suggested as the inorganic binder at block 359. The illustrative embodiment can achieve a target porosity of 70% using ratios by weight of approximately 25% mullite fiber, 10% HPMC binder, 30% graphite pore former, 5% colloidal silica inorganic binder, and 30% water. The ratios of the mixture constituents in the illustrative embodiment can be varied proportionally to attain porosity values of 55% to 85%, as shown in FIG. 9.

The fiber, binder, pore former, inorganic binder, and fluid are mixed to a homogeneous mass at block 362. It will be appreciated that the mixing step can include a dry mix aspect, a wet mix aspect, and a shear mixing aspect. It has been found that shear or dispersive mixing is desirable to produce a highly homogeneous distribution of fibers within the mass. This distribution is particularly important due to the relatively low concentration of ceramic, or specifically, mullite material in the mixture. As the homogeneous mixture is being mixed, the rheology of the mixture may be adjusted as shown in block 364. As the mixture is mixed, the rheology continues to change. The rheology may be subjectively tested, or may be measured to comply with the desirable area as illustrate in Table 5 of FIG. 6, as mixtures falling within this desired area have a high likelihood of properly extruding. The mixture is then extruded into a green substrate as shown in block 368. In the case of screw extruders, the mixing may also happen inside the extruder itself, and not in a separate mixer. In such cases, the shear history of the mixture has to be carefully managed and controlled. The green substrate has sufficient green strength to hold its shape and fiber arrangement during the curing process. The green substrate is then cured as shown in block 370.

The curing step shown at block 370 removes fluid from the green substrate, and a controlled burn-off of organic materials, such as the binder and pore former. The curing process continues, at increasing temperatures, to form inorganic bonds that couple overlapping fibers. Inorganic bonds formed during the curing step 370 in the illustrative embodiment can include aluminosilicate bonds, glass bonds, amorphous bonds, crystalline bonds, ceramic bonds and/or mechanical bonds.

Figure 10:
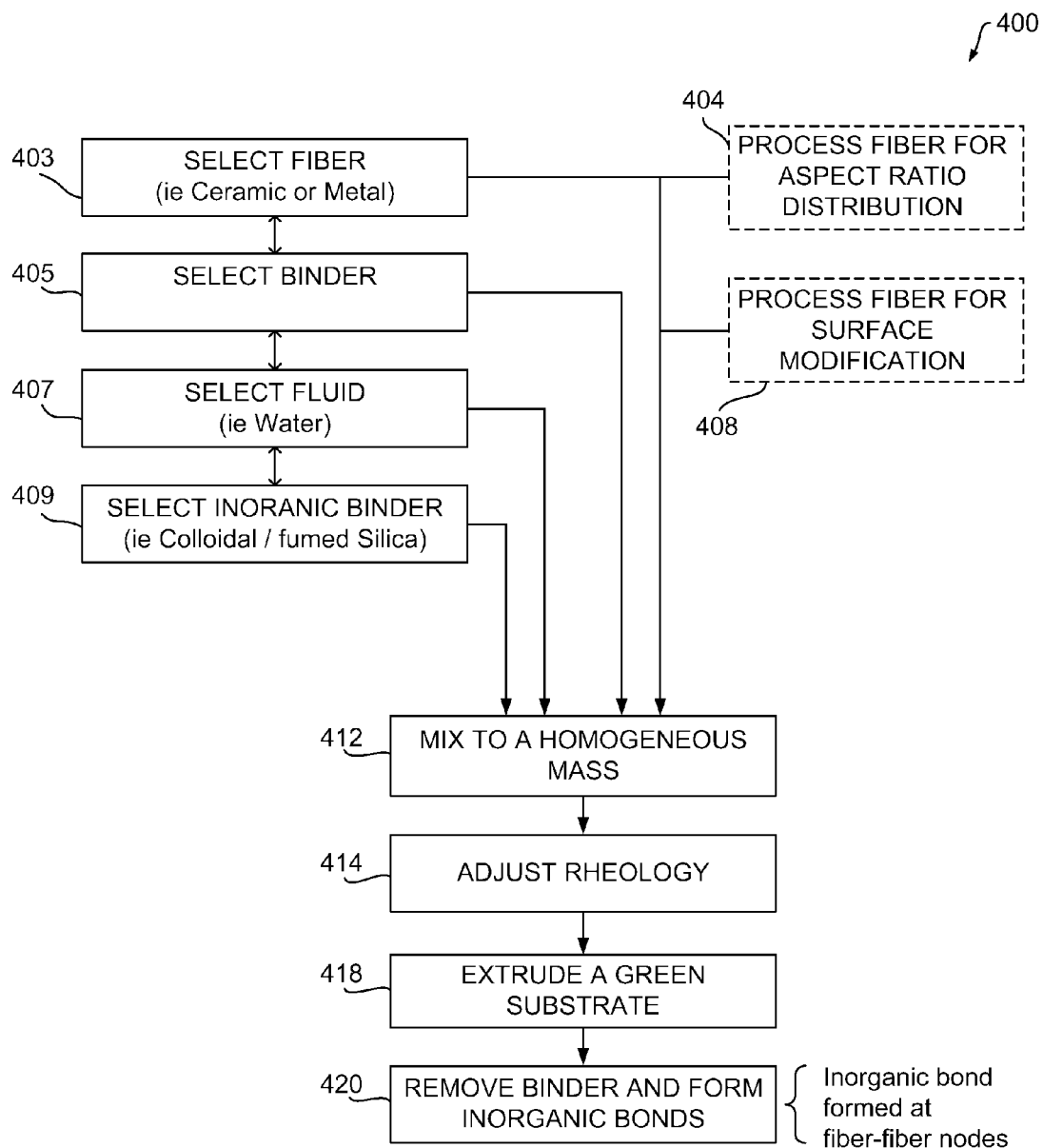
FIG. 10 is a block diagram of a first alternative embodiment of a method for producing a porous substrate in accordance with the present invention.

Referring now to FIG. 10, an alternative illustrative embodiment of a method for producing a porous substrate is shown at 400. In this embodiment, ceramic or metal fibers are selected at block 403, that are optionally processed for aspect ratio distribution at block 404, as previously described in reference to block 354 in FIG. 9. Similarly, the fibers can be optionally processed for surface modification through the application of dispersants and/or materials that alter the electronic charge of the fibers. A binder is selected from Table 2 of FIG. 6 as shown at block 405 that provides sufficient plasticity during extrusion, and facilitates green state strength, as well as controlled burn off during the curing step. In this embodiment, a pore former is not needed to enhance the porosity of the porous substrate, as sufficient porosity is obtained through the use of fibers and binders (including inorganic binders) alone. Fumed silica is selected as the inorganic binder at block 409, and fluid, which is typically water, can be selected from Table 4 of FIG. 6, as shown in block 407. It will be appreciated that the mixture may be adjusted according to target porosity, the specific application and process considerations.

A mixture of the fiber, binder, inorganic binder, and fluid is performed at block 412 while adjusting the rheology at block 414. The mixture is extruded into a green substrate at block 418 by extruding, for example, a honeycomb substrate consisting of at least one channel that provides an inlet to the porous substrate. The curing step is subsequently performed at step 420. In this embodiment, the curing process removes the fluid from the green substrate in a drying process. Since there is no pore former used, the curing process then burns off organic material that is essentially the organic binder material. The next phase of the curing step forms inorganic bonds to couple overlapping fibers. Inorganic bonds are formed at fiber-to-fiber nodes by forming, for example, glass bonds that result from the fumed silica inorganic binder flowing to adjacent fiber nodes. Other inorganic bonds, such as aluminosilicate bonds, amorphous bonds, crystalline bonds, ceramic bonds and mechanical bonds are similarly formed.

Figure 11:
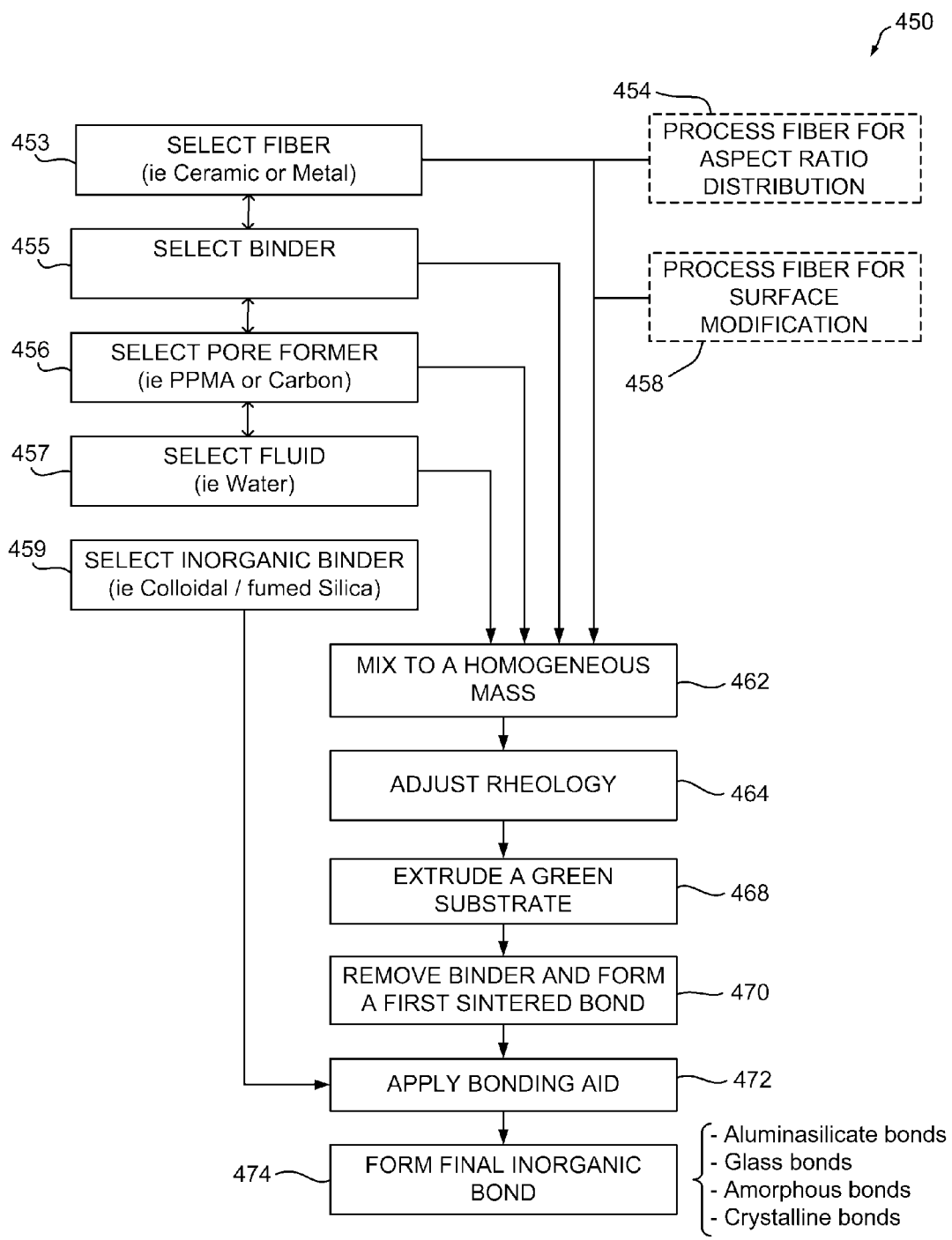
FIG. 11 is a block diagram of a second alternative embodiment of a method for producing a porous substrate in accordance with the present invention.

Referring now to FIG. 11, a second alternative embodiment of a method for producing a porous substrate is shown at 450. In this embodiment, ceramic or metal fibers are selected at block 453, that are optionally processed for aspect ratio distribution at block 454, as previously described in reference to block 354 in FIG. 9. Similarly, the fibers can be optionally processed for surface modification through the application of dispersants and/or materials that alter the electronic charge of the fibers. A binder is selected from Table 2 of FIG. 6 as shown at block 455 that provides sufficient plasticity during extrusion, and facilitates green state strength, as well as controlled burn off during the curing step. in this embodiment, a pore former is selected from Table 3 of FIG. 6, as shown in block 456. In some cases, however, sufficient porosity may be obtained through the use of fibers and binders only. The porosity is achieved not only by the natural packing characteristics of the fibers, but also by the space occupied by the binders, solvents and other volatile components which are released during the de-binding and curing stages. To achieve higher porosities, additional pore formers may be added. Pore formers are also selected according to their controlled burn off capabilities, and may also assist in plasticizing the mixture. Fluid, which is typically water, is selected from Table 4 of FIG. 6 as shown in block 457. Other liquid materials may be added, such as a dispersant, for assisting in separation and arrangement of fibers, and plasticizers and extrusion aids for improving flow behavior of the mixture.

A mixture of the fiber, binder, pore former and fluid is performed at block 462 while adjusting the rheology at block 464. The mixture is extruded into a green substrate at block 468 by extruding, for example, a honeycomb substrate consisting of at least one channel that provides an inlet. In this embodiment, the curing step is performed in two phases. In a first curing phase, the fluid dried and the organic binder and pore former is burned off, as shown at block 470. In this first curing phase, it may be necessary to form sintered bonds between fibers that make contact, so that the substrate has sufficient strength to be handled prior to completion of the final curing stage. Liquid state sintered bonds can be formed at elevated sintering temperatures or solid state sintered bonds can be formed between fibers.

An inorganic binder, selected from Table 2 of FIG. 6, as shown at block 456, such as, for example, colloidal silica, is applied to the porous substrate after the first curing phase at block 472. Here, the substrate can be dipped in a solution of inorganic binder suspended in a liquid, or infiltrated into the substrate by pouring a solution containing inorganic binder, or subjecting the substrate to a stream of liquid or gas containing the inorganic binder in suspension. The second phase of the curing step then continues at block 474, where the substrate containing the inorganic binder is subjected to a heated environment to form inorganic bonds that couple overlapping fibers. Inorganic bonds formed during the second phase of the curing step 474 can include aluminosilicate bonds, glass bonds, glass-ceramic bonds, amorphous bonds, crystalline bonds, ceramic bonds and/or mechanical bonds.

The fiber extrusion system offers great flexibility in implementation. For example, a wide range of fibers and additives, may be selected to form the mixture. Several mixing and extrusion options exist, as well as options related to curing method, time, and temperature. With the disclosed teachings, one skilled in the extrusion arts will understand that many variations may be used. Honeycomb substrate is a common design to be produced using the technique described in the present invention, but other shapes, sizes, contours, designs can be extruded for various applications.

For certain applications, such as use in filtration devices (DPF, oil/air filters, hot gas filters, air-filters, water filters etc) or catalytic devices (such as 3-way catalytic converters, SCR catalysts, deozonizers, deodorizers, biological reactors, chemical reactors, oxidation catalysts etc) the channels in an extruded substrate may need to be plugged. Material of composition similar to the extruded substrate is used to plug the substrate. The plugging can be done in the green state or on a sintered substrate. Most plugging compositions require heat treatment for curing and bonding to the extruded substrate. These filtration devices or catalytic devices are typically mounted in a housing or can with input and output lines routed to and from the housing. In this way, the porous substrate can be applied in various applications, including a vehicle air filter, vehicle exhaust filter for processing exhaust gas, or a vehicle cabin filter.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

What is claimed is:

1. A method of making a porous honeycomb substrate, comprising:
   mixing ceramic-material fibers, organic binder, inorganic binder, pore former, and fluid into a homogeneous mass;
   extruding the homogeneous mass into a green honeycomb substrate; and
   forming inorganic bonds between the ceramic fibers.

2. The method according to claim 1, wherein the inorganic binder is a precursor material for the inorganic bonds.

3. The method according to claim 1, wherein the inorganic binder is in a colloidal form.

4. The method according to claim 1, wherein the inorganic binder is in a fumed or fused form.

5. The method according to claim 1, wherein the inorganic binder includes silica, which is a precursor material for the inorganic bonds.

6. The method according to claim 1, wherein the homogenous mass, by weight, has about 10% to about 30% ceramic-material fiber.

7. The method according to claim 1, wherein the homogenous mass, by weight, has about 5% to about 60% pore former.

8. The method according to claim 1, wherein the homogenous mass, by weight, has about 5% to about 20% organic binder.

9. The method according to claim 1, wherein the homogenous mass, by weight, has about 5% to about 30% inorganic binder.

10. The method according to claim 1, wherein the homogenous mass, by weight, has about 10% to about 30% fluid.

11. The method according to claim 1, wherein the homogenous mass, by weight, has:
    about 10% to about 60% ceramic-material fiber;
    up to about 60% pore former;
    up to about 20% organic binder;
    up to about 30% inorganic binder; and
    about 10% to about 40% fluid.

12. The method according to claim 1, wherein the homogenous mass, by weight, has:
    about 10% to about 60% mullite fiber;
    about 5% to about 60% pore former selected from Table 3 of FIG. 6;
    about 5% to about 20% organic binder;
    about 5% to about 30% colloidal silica; and
    about 10% to about 40% water.

13. The method according to claim 1, wherein some of the inorganic bonds are formed between overlapping ceramic fibers that are touching.

14. The method according to claim 1, wherein some of the inorganic bonds are formed between overlapping ceramic fibers that are not touching.

15. The method according to claim 1, wherein some overlapping fibers are not bonded.

16. The method according to claim 1, wherein the forming step comprises sintering the green substrate.

17. The method according to claim 16, wherein the sintering step comprises forming bonds between overlapping ceramic fibers to form the porous substrate's structure.

18. The method according to claim 16, wherein the inorganic bonds are glass, glass-ceramic, amorphous, or ceramic bonds.

19. The method according to claim 16, wherein the inorganic bonds include a meniscus attachment to the fibers.

20. The method according to claim 1, further including the step of burning off substantially all of the fluid, pore former, and organic binder.

21. The method according to claim 1, wherein the ceramic fibers have formed bonds to create an open pore network.

22. A method for making a porous honeycomb substrate, comprising:
    selecting fiber from Table 1 of FIG. 6;
    selecting inorganic binder from Table 2 of FIG. 6;
    selecting fluid from Table 4 of FIG. 6;
    mixing the fiber, inorganic binder, and fluid into a homogeneous mass;
    adjusting the rheology of the homogenous mass to be extrudable;
    extruding the homogenous mass into green honeycomb substrates; and
    forming inorganic bonds between fibers.

23. The method according to claim 22 further including the steps of:
    selecting additives selected from the group consisting of: pore formers, strengthening agents, opacifiers, extrusion aids, dispersants, pH modifiers, organic binders, clays, washcoat materials, and catalyst; and
    mixing the additives into the homogenous mass.

24. The method according to claim 22 wherein the step of extruding further comprises extruding a honeycomb substrate having rectangular channels.

25. A process for curing a green extruded substrate into a porous block, the porous block having at least one channel, the process comprising:
    removing fluid from the green extruded substrate;
    burning off organic material; and
    forming inorganic bonds to couple overlapping fibers within the extruded substrate;
    wherein the at least one channel provides an inlet to the porous block.

26. The curing process according to claim 25, wherein the inorganic bonds are glass, glass-ceramic, amorphous, or ceramic bonds.

27. The curing process according to claim 25, further including the step of flowing inorganic material to form the inorganic bond.

28. The curing process according to claim 25, further including the step of positioning inorganic material between overlapping fibers.

29. The curing process according to claim 25, further including the step of positioning inorganic material around overlapping fibers.

30. The curing process according to claim 25, wherein coupling the fibers includes forming an inorganic meniscus.

31. A process for curing a green extruded substrate into a porous block, the porous block having a channel, the process comprising:
    removing fluid from the green extruded substrate;
    burning off organic material;
    forming inorganic bonds to couple overlapping fibers within the extruded substrate; and
    maintaining, during the forming step, structural integrity of the channel.

32. The curing process according to claim 31, wherein the inorganic bonds are glass, glass-ceramic, amorphous, or ceramic bonds.

33. The curing process according to claim 31, further including the step of flowing inorganic material to form the inorganic bond.

34. The curing process according to claim 31, further including the step of positioning inorganic material between overlapping fibers.

35. The curing process according to claim 31, further including the step of positioning inorganic material around overlapping fibers.

36. The curing process according to claim 31, wherein coupling the fibers includes forming an inorganic meniscus.

37. A method of making a porous honeycomb substrate, comprising:
    mixing ceramic-material fibers, organic binder, inorganic binder, and fluid into a homogeneous mass;
    extruding the homogeneous mass into a green honeycomb substrate; and
    forming inorganic bonds between the ceramic fibers.

38. The method according to claim 37, wherein the inorganic binder is a precursor material for the inorganic bonds.

39. The method according to claim 37, wherein the inorganic binder is in a colloidal form.

40. The method according to claim 37, wherein the inorganic binder is in a fumed or fused form.

41. The method according to claim 37, wherein the inorganic binder includes silica, which is a precursor material for the inorganic bonds.

* * * * *

UNITED STATES PATENT AND TRADEMARK OFFICE
CERTIFICATE OF CORRECTION

PATENT NO. : 7,578,865 B2 Page 1 of 1
APPLICATION NO. : 11/465758
DATED : August 25, 2009
INVENTOR(S) : Zuberi et al.

It is certified that error appears in the above-identified patent and that said Letters Patent is hereby corrected as shown below:

Column 17, line 36 shall read:

$$3Al_2O_3 \cdot 2SiO_2$$

Signed and Sealed this

Fifth Day of January, 2010

David J. Kappos
*Director of the United States Patent and Trademark Office*